(12) United States Patent
Patni et al.

(10) Patent No.: US 11,249,734 B2
(45) Date of Patent: Feb. 15, 2022

(54) TRI-AFFINITY MODEL DRIVEN METHOD AND PLATFORM FOR AUTHORING, REALIZING, AND ANALYZING A CROSS-PLATFORM APPLICATION

(71) Applicants: Sangeeta Patni, Bengaluru (IN); Kartik Ram Asatkar, Nagpur (IN)

(72) Inventors: Sangeeta Patni, Bengaluru (IN); Kartik Ram Asatkar, Nagpur (IN)

( * ) Notice: Subject to any disclaimer, the term of this patent is extended or adjusted under 35 U.S.C. 154(b) by 0 days.

(21) Appl. No.: 16/967,742

(22) PCT Filed: Feb. 6, 2019

(86) PCT No.: PCT/IB2019/050938
§ 371 (c)(1),
(2) Date: Aug. 6, 2020

(87) PCT Pub. No.: WO2019/155369
PCT Pub. Date: Aug. 15, 2019

(65) Prior Publication Data
US 2020/0371755 A1    Nov. 26, 2020

(30) Foreign Application Priority Data

Feb. 7, 2018   (IN) .............................. 201841004648

(51) Int. Cl.
*G06F 9/44*      (2018.01)
*G06F 8/34*      (2018.01)
(Continued)

(52) U.S. Cl.
CPC .................. *G06F 8/34* (2013.01); *G06F 8/41* (2013.01); *H04L 51/02* (2013.01)

(58) Field of Classification Search
CPC ............... G06F 8/34; G06F 8/41; H04L 51/02
(Continued)

(56) References Cited

U.S. PATENT DOCUMENTS

| | | |
|---|---|---|
| 7,555,706 B2 * | 6/2009 | Chapman ............... G05B 15/02 715/234 |
| 10,331,423 B1 * | 6/2019 | Parsolano ............... G06F 9/451 |

(Continued)

OTHER PUBLICATIONS

Brisebois et al., "A Semantic Metadata Enrichment Software Ecosystem based on Metadata and Affinity Models", 2017, MECS—Modern Education and Computer Science Press, 13 pages. (Year: 2017).*

(Continued)

*Primary Examiner* — Ted T. Vo
(74) *Attorney, Agent, or Firm* — Ashok Tankha

(57) ABSTRACT

A tri-affinity model driven platform (TAMDP) employs a tri-affinity model driven method using a human affinity model (HAM), a machine affinity model (MAM), and an analysis affinity model (AAM), to generate an application specific instance of predefined meta-models for building a cross-platform application. A developer authors an application in the HAM which is compiled to the MAM by a compiler, which is transformed to the AAM by a model-to-model transformer. A translator optionally translates a HAM to another HAM. A generator generates source code from MAM. Build tooling builds application binaries for different rendering types from a source code generated for the application. A development time analyzer and visualizer (DTAV) enables development time analyses using the AAM. After prototyping and introspection, a TAMDP runtime subsystem executes the generated application and a machine learning based recommendation engine enhances the application using the AAM after analysis by the DTAV and a runtime analyzer and visualizer.

10 Claims, 24 Drawing Sheets

(51) Int. Cl.
*G06F 8/41* (2018.01)
*H04L 12/58* (2006.01)

(58) Field of Classification Search
USPC .................................................. 717/104–109
See application file for complete search history.

(56) References Cited

U.S. PATENT DOCUMENTS

| | | | |
|---|---|---|---|
| 10,372,721 B2* | 8/2019 | Karpistsenko | G06F 16/25 |
| 10,504,020 B2* | 12/2019 | Trenholm | G06K 9/6227 |
| 10,985,997 B2* | 4/2021 | Duggal | G06Q 30/0635 |
| 2014/0019865 A1* | 1/2014 | Shah | H04N 21/8545 |
| | | | 715/731 |
| 2014/0258968 A1* | 9/2014 | Brown | G06F 40/166 |
| | | | 717/103 |
| 2016/0188302 A1* | 6/2016 | Fredrick | G06F 8/34 |
| | | | 717/107 |
| 2018/0165604 A1* | 6/2018 | Minkin | G06N 5/022 |

OTHER PUBLICATIONS

Dumas et al., "Multimodal Interfaces: A Survey of Principles, Models and Frameworks", 2014, ResearchGate, pp. 1-25. (Year: 2014).*

Revault et al., "A Metamodeling technique: The METAGEN system", 2014, ResearchGate, pp. 1-13. (Year: 2014).*

Danziger et al., "Adapting Human-Machine Interfaces to User Performance", 2008, IEEE, 5 pages. (Year: 2008).*

* cited by examiner

TRI-AFFINITY MODEL DRIVEN METHOD AND PLATFORM FOR AUTHORING, REALIZING, AND ANALYZING A CROSS-PLATFORM APPLICATION

This is a national stage application of the Patent Cooperation Treaty (PCT) international application titled "Tri-Affinity Model Driven Method And Platform For Authoring, Realizing, And Analyzing A Cross-Platform Application", application number PCT/IB2019/050938, filed in the International Bureau of the WIPO on Feb. 6, 2019, which claims priority to and benefit of Provisional Patent application no. 201841004648, filed in India on Feb. 7, 2018 and titled "Tri-affinity Model Driven Method And Platform For Authoring, Realizing, And Analyzing A Cross-platform Application".

FIELD OF THE INVENTION

Embodiments of the present disclosure relate to cross-platform application development, and more particularly to, hi-affinity model driven method and platform for authoring, realizing, and analyzing a cross-platform application.

BACKGROUND

Software applications are all around us. Software applications impact a significant part of personal and work lives of humans and have digitized large parts of interactions of humans with businesses and other humans, creating a digital continuum. Businesses need to respond to the digital continuum by building applications that are available and responsive to customers of the businesses and users in a digital medium and provide a ubiquitous digital means of accessing products and services of the businesses.

The current state of software application enabled business processes is characterized by a significant usage of devices other than desktop computers by customers and users. With increased usage, ubiquity, and multiplicity of connected devices having a general-purpose computing ability, businesses are increasingly choosing to build applications that run on multiple client runtime platforms. Such applications are known as cross platform applications. Application developers and business information technology (IT) professionals that are tasked to build and run such cross-platform applications need to carefully choose the client runtime platforms on which the cross-platform applications are to be made available. The choice of the client runtime platforms is based on factors comprising, for example, relevance and ubiquity of client runtime platforms for target users, cost of host devices offering client runtime platforms, feature sets of client runtime platforms, availability of client runtime platforms, etc. The target users may change often as new devices are introduced in the market, making the task of availability of the cross platform applications on multiple target devices and client runtime platforms hard, specifically as the existing underlying platforms are evolving rapidly, with new modes of user engagement coming into existence with new releases of the underlying platforms.

Moreover, application developers and business IT professionals need to have a continued focus on user expectations, ensuring users have a good experience with the products and services, while dealing with an unprecedented increase in access points, reach, penetration, for example, in home automation, internet of things (MT), wearables, automobiles, etc.

The application driven digital continuum with the continuously engaged user community also provides a significant opportunity as businesses now have an overview of how their customers and users interact and engage with their products and services using the digital medium, by collecting and analyzing data provided by digital interactions of the users. Businesses also have access to information of how, when, and where their customers interact with the businesses, enabling the businesses to fine tune, personalize, and customize their products and services. Data analysis, with new technologies such as artificial intelligence, is providing tools to businesses to improve the customer intimacy and delivery.

A typical cross-platform application consists of a multiplicity of user interfaces, each with a target client device, data models, means of authenticating users by validating the identity of permitted end users of the cross-platform application, means of authorizing users to enforce access control to various parts of the cross-platform application, a domain logic including process flows, integrations to other services comprising, for example, storage of cross-platform application data to a persistent store, ability to send notifications to end users, provision of an application programming interface (API) of the cross-platform software application for consumption by other systems, use of features of the target client device, and localizations for an intended end user audience. A typical cross-platform application is developed in two parts, namely, an application server side and an application client side. The application server side should contain the domain logic and associated constituents. The application client side contains a user interface and associated constituents. The cross-platform applications comprise any of the following combinations, namely, server side only, server side and client side, and client side only.

The cross-platform application is developed using an application development platform. The application development platform typically comprises an authoring language, a programming framework, programming libraries, and an interpreter or a compiler. The application server side is hosted on a platform known as a server runtime platform. Examples of server runtime platforms are SalesForceI® of salesforce.com, Inc., Parse® of Parse, LLC, IBM® Cloud of International Business Machines Corporation. The application client side is hosted on a platform known as a client runtime platform. Client runtime platforms can be classified as smartphone platforms, for example, Android® by Google LLC, iOS by Apple Inc., Windows Phone® by Microsoft Corporation, internet of things (IoT) platforms, for example, Arduino® by Arduino Ag Corporation, Raspberry® by Raspberry Pi Foundation, etc.

Application development systems or platforms in use today can be categorized as legacy, contemporary, native, and cross-platform. The legacy platforms have been the platforms of choice for over a decade and more. Examples of legacy platforms are Java® platform, Enterprise Edition, by Oracle America, Inc., Microsoft .Net® by Microsoft Corporation, etc. Many open source programming frameworks, for example, Spring Framework® by Pivotal Software, Inc., Hibernate® by JBoss, Inc., etc., are also available for the legacy platforms. Legacy platforms provide a low abstraction development environment. The low abstraction development environment presents a large skill surface area in terms of varied technologies to be known for building an application. The legacy platforms are mostly used for building desktop web applications. The legacy platforms are not suitable for recent non-web clients such as smartphones, wearables, etc. The legacy platforms are also not suitable for cross platform application development. The legacy platforms are dominant in enterprise application development.

Contemporary platforms have gained traction in the last 7 to 8 years. Examples of contemporary platforms are Ruby-on-Rails®, Node.js® by Joyent Inc., Angular, React, etc. The contemporary platforms provide a low abstraction development environment. The contemporary platforms require narrow but deep skills in multiple technologies for building an application. The contemporary platforms are mostly used for building scalable web applications and also partially address cross-platform application development by targeting browser-based clients for some of the target devices. While the contemporary platforms are dominant in consumer application development, the contemporary platforms have also gained acceptance and adoption in enterprise application development.

Native platforms are provided by operating system (OS) or device creators. Examples of native platforms are Android® by Google LLC, iOS, Arduino®, Raspberry®, etc. The native platforms are used for developing applications for the OS or the devices alone and there is no possibility of cross platform development. The native platforms typically provide a low abstraction development environment. The native platforms do not provide for application server-side development and are used only for building application client sides. The rate of evolution of the native platforms has been high as new major versions of the OS, language, and devices are released about once a year.

The increase in demand for cross-platform applications has given rise to a new category of software development platforms known as cross-platform application development platforms. Cross-platform application development platforms are niche application development platforms built during the smartphone era specifically for smartphone based cross-platform application development. The cross-platform application development platforms provide better abstractions as compared to legacy platforms and contemporary platforms for a user interface specification that is leveraged for the development of cross platform applications. Most cross-platform application development platforms provide a what-you-see-is-what-you-get (WYSIWYG) user interface authoring tool. The cross-platform application development platforms, for example, Kony® by Kony, Inc., Mendix® by Mendix B.V. LLC, OutSystems® by OutSystems, Software Em Rede S.A., Betty Blocks, etc., address cross-platform application development by targeting browser based clients as well as native device platforms.

A predominant method adopted by most application creators for creating cross-platform applications is to build the server side using a legacy platform or a contemporary platform and build the client side using native platforms. In this method, the application creators need to hire application developers skilled in each of the native platforms, the legacy platforms, or the contemporary platforms. Such a development project would require a significant amount of time for application development and testing. Since the application development process is manual, the application development process is plagued with weaknesses inherent in any human process, for example, a significant amount of time taken, and costs incurred due to a hand coding process from the conception of an idea to development of the application by an application developer with limited scope of re-using and analyzing the code, high dependence of the application development process on the application developer's skill level, leading to non-predictability of the overall quality of the application, etc. Future changes to the application due to business requirements or the evolution of a native device platform would require a team of application developers to be commissioned again, which would result in substantial costs for the business. Moreover, the conventional methods do not consider the new need of analysis in development time and runtime of the application. At best, analysis has been seen as an addendum to development activities. Furthermore, the conventional application development methodology does not provide the external world with prior knowledge about what the application contains. Users have to use the application to infer what the application does, what the application contains, and how the application interacts with the user's device. The developed application is a black box for the users pile only the application developers are aware of the application completely. There is no way a human or a machine user can know about an application prior to using the application.

As legacy platforms offer low abstraction and a lot of primitives, application development takes a long time and requires a high level of skill. Moreover, building native cross-platform applications is not possible with native application client-sides not being supported. Contemporary platforms do not exhibit much change in abstraction as compared to legacy platforms. Development of cross-platform applications is possible using contemporary platforms, but the development is limited to a browser-based application clients. By design, native platforms cannot be used for cross-platform application development. Cross-platform application development platforms continue to exhibit low levels of abstraction except for user interfaces. The cross-platform application development platforms are typically smartphone focused. To build cross platform applications targeted at multiple client platforms using the conventional method of hand coding using low abstraction platforms is not resource efficient and does not scale. The conventional method for cross-platform application development is not suitable due to factors such as increased demand for cross-platform applications, increase in need for short lived or situational applications, emergence of newer application deployment platforms such as internet of things (IoT), bots, etc., cost incurred on hiring developers, need for faster development of applications, and absence of analysis during the development and runtime phases of the applications.

To provide a solution for building applications for multiple platforms and multiple devices, practitioners have developed model driven engineering methods using high abstraction modeling techniques to model platform independent behaviours of applications, and then implementing model transformations to achieve platform specific implementations. Model driven high abstraction platforms for development of cross platform applications that are targeted at multiple client platforms are beneficial, for example, due to reduction in skill level required to build applications, incorporation of best practices in the development of the applications, churning out more applications with smaller development teams, increase in demand for applications, decrease in maintenance cost despite the rapid evolution in underlying platforms, increase in ability to incorporate design and development feedback from the business or domain personnel during the process of design and development, etc. The model-driven method while being suitable for cross-platform application development, suffers low adoption among lay developers and business information technology (IT) application developers as the model-driven method is thought of being complex, requiring high skill levels, with tooling perceived to be expensive.

Hence, there is a need for a tri-affinity model driven method and a tri-affinity model driven platform for developing, realizing, and analyzing a cross platform application.

SUMMARY OF THE INVENTION

The tri-affinity model driven method and the tri-affinity model driven platform (TAMDP) disclosed herein address the above recited need for authoring, realizing, and analyzing a cross-platform application. The TAMDP employs the tri-affinity model driven method and allows a lay developer to develop cross platform applications.

The tri-affinity model driven method disclosed herein provides a modeling framework for cross-platform applications with three affinities, that is, a human affinity, a machine affinity, and an analysis affinity, each designed for its role and purpose in designing, building and analyzing cross-platform applications. In the tri-affinity model driven platform (TAMDP), each of the three affinities is designed with a specific purpose in the authoring, realization, and analysis of cross-platform applications. The three affinity models are a human affinity model (HAM), a machine affinity model (MAM), and an analysis affinity model (AAM).

The human affinity model is used by humans to author an application. The machine affinity model is used by machines to realize the application. The analysis affinity model is used by humans and machines to perform various development time and runtime analyses, recommendations, and enhancement of the application. The analysis affinity model aids development, maintenance, and operations of the application towards a specific purpose of the application. From a human affinity model or a machine affinity model of a cross-platform application, the other affinity models, that is, the machine affinity model and the analysis affinity model or the human affinity model and the analysis affinity model can be derived.

The class of applications that can be developed and run using the tri-affinity model driven method (TAMDM) comprises applications that are targeted to run on various server-side platforms, for example, the tri-affinity model driven platform (TAMDP), Amazon Web Services (AWS®) platform as a service (PaaS) by Amazon Technologies, Inc., Azure® PaaS by Microsoft Corporation, blockchain platforms, etc., made available by vendors as a platform as a service, hosted, on a cloud, and on-premise. The class of applications that can be developed and run using the TAMDM further comprises applications that are targeted to run on various client-side platforms, for example, smartphones with operating systems such as Android®, iOS, etc., internee of things (IoT) platforms such as Arduino®, Raspberry®, etc., interactive voice response systems (IVRSs), voice operated personal assistants such as Alexa® of Amazon Technologies, Inc., Google Assistant by Google LLC, etc., instant messengers such as the Facebook® messenger of Facebook, Inc., WhatsApp® of Whatsapp Inc., Skype® of Microsoft Corporation, etc., bots of, for example, Microsoft®, Facebook®, etc. The class of applications that can be developed and run using the TAMDM further comprises applications that store their data on various persistent data stores, for example, a relational database management system (RDBMS), a NoSQL database, distributed ledgers, etc., and a class of applications that connects to a variety of data sources such as an enterprise resource planning (ERP) software, a software as a service (SaaS) software, web application programming interfaces (APIs), sensors, artificial intelligence (AI) or machine learning (ML) based engines, spreadsheets, etc.

The scope of operations of an application developed using the tri-affinity model driven method (TAMDM) comprises presenting user interfaces, a chat interface including an application chat hot, accessing data objects, authenticating users, controlling access to various parts of the application based on authorization, containing business logic that may include work flows, integrating with third party data sources and services, sending notifications to end users on multiple channels, synchronizing selected data on a client device, introspecting an application model to provide information about usage and intent of the application, providing recommendations for enhancing the application, recording the usage of the application by users, that is, an administrator and the end users, providing an application programming interface (API) of the software application for consumption by other systems, usage of native features of the client device, and localizations for an intended end user audience.

The tri-affinity model driven platform (TAMDP), which employs the hi-affinity model-driven method (TAMDM), comprises predefined canonical meta-models for applications and hi-affinity model-driven tooling and infrastructure. A human application developer authors or hand-codes an application specification using a domain specific modeling language such as A Language for Applications (Alfa) that results in creation of the human affinity model of the application. The TAMDP comprises a compiler for transforming the application specific human affinity model to an application specific machine affinity model. The TAMDP further comprises a model-to-model transformer for transforming the machine affinity model to the analysis affinity model. The TAMDP further comprises a development time analyzer and visualizer for performing development time analyses of the application using the analysis affinity model. The TAMDP further comprises a model-to-source code generator for generating a source code for the application as one of many rendering types by generating a source code for target platforms using model driven engineering methods. The TAMDP further comprises build tooling for building application binaries for the server side and the target"n" clients, along with native platform.

The tri-affinity model driven platform (TAMDP) implements a prototyping mechanism for testing the application in a prototype mode using statically provided or randomly generated sample data and deploying and publishing an application server and"n" clients on an instance of the TAMDP runtime and an application store of the TAMDP. The TAMDP further comprises an introspection tool for performing an introspection of the application at various stages within the TAMDP runtime infrastructure, on deployment of the application within the TAMDP run time infrastructure. The TAMDP executes the generated application binary in an instance of a TAMDP runtime environment for N clients and a TAMDP server type of rendition. The TAMDP further comprises runtime application management tools for managing the running application and recording an audit log for actions performed by the end users and administrators of the application. The TAMDP further comprises a runtime analyzer and visualizer for analyzing the application during runtime of the application using the analysis affinity model and application usage data. The TAMDP further comprises a machine learning based recommendation engine for enhancing the application using the analysis affinity model by generating machine learning based recommendations. The TAMDP further comprises a TAMDP runtime subsystem that performs multiple functions comprising, for example, notification generation, synchronization, authentication, authorization, analysis, licensing, versioning, application store publication, and name spacing. The TAMDP further comprises a pluggable domain logic runtime infrastructure for running the domain logic contained in the cross-platform application.

The tri-affinity model driven platform (TAMDP) allows for machine processable application specification that provides multiple opportunities for generation, automation, analysis, reuse, and enhancement of the cross-platform application. The TAMDP provides an abstracted method for designing and specifying the cross-platform application, thereby obviating the need for skills in developing the cross-platform application on diverse target platforms. The source code for the cross-platform application generated from the machine affinity model using the model-to-source code generator reduces costs and time required for the application development and enhancement, resulting in an enhanced development process. Furthermore, the specification of the application in the form of three models makes the entire specification available to human users via various inference mechanisms comprising visualizations, and to machines, such that a user or a user agent can make optimal choices about the usage of the application as the application is no longer a black box. The metadata of the application enables discovery and matching of the application with the target platforms.

The cross-platform applications generated using the tri-affinity model driven platform (TAMDP) operate in both offline and online modes. The cross platform applications source data from multiple data sources, for example, databases, enterprise applications, cloud based applications, sensors, and application programming interfaces (APIs), etc. The cross-platform applications interact with human users in a push mode where the human users request for information, and in a pull mode where the human users are sent information based on an event. The cross-platform applications operate across multiple user agents, for example, humans, machines, and devices, across multiple form factors such as smart phones, desktop computers, tablet computers, watches, etc., and across multiple device platforms, for example, the Android® platform, the iOS platform, web platforms, and automotive platforms. The cross-platform applications interface with man users and machines via an information interface, for example, via screen based devices, APIs, an interactive voice response system (IVRS), a short message service (SMS), etc. The cross-platform applications generated using the TAMDP are used for business purposes, consumer purposes, and informational purposes. The cross-platform applications comprise third party APIs and web services, for example, maps and payment interfaces and also use native device features, for example, a camera, location, Bluetooth® communication capability of Bluetooth Sig, Inc., near field communication (NFC), etc.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Figure 1A:
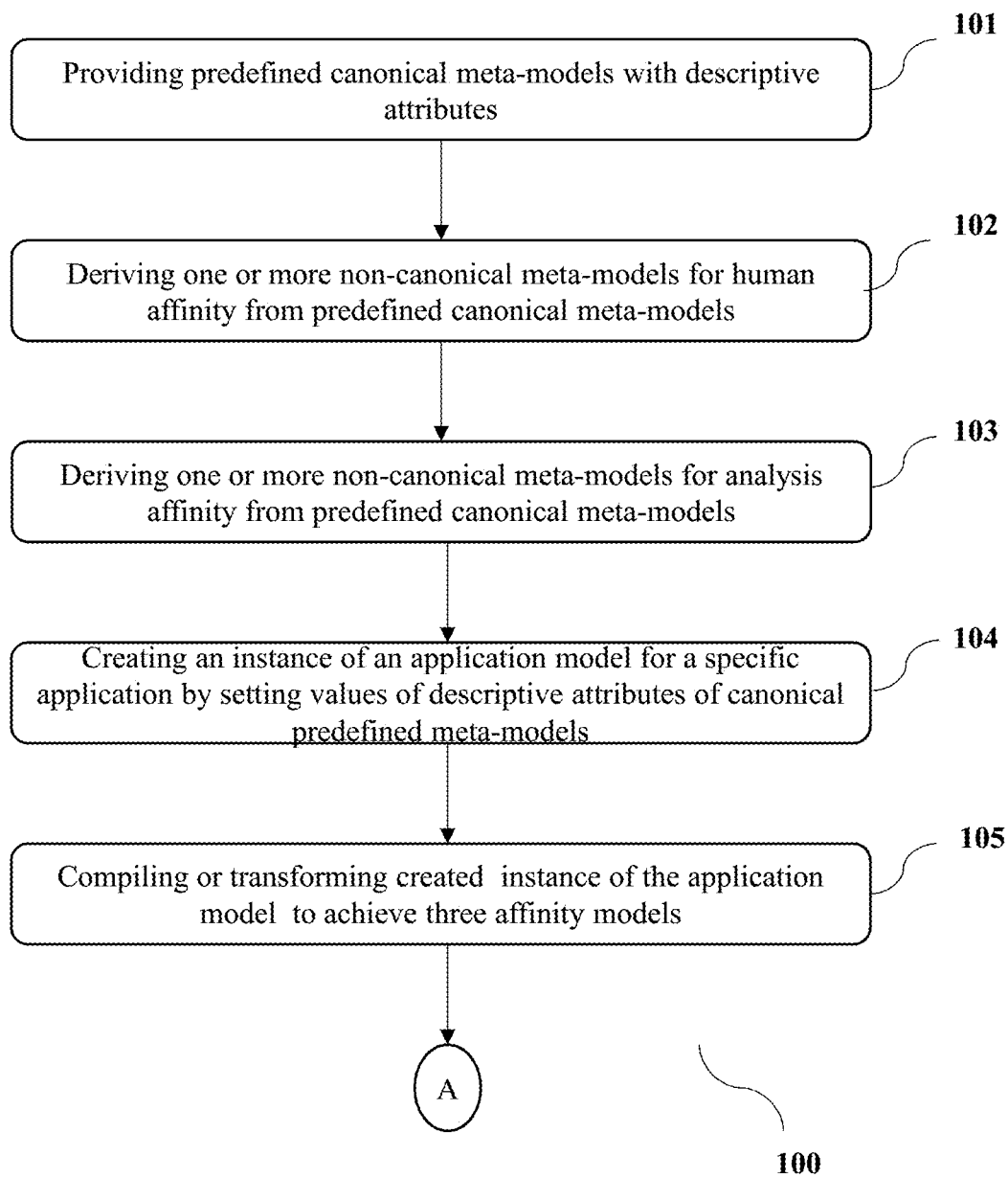
FIGS. 1A-1C illustrate a method for authoring, realizing, and analyzing a cross platform application using a tri-affinity model driven platform.
Figure 1B:
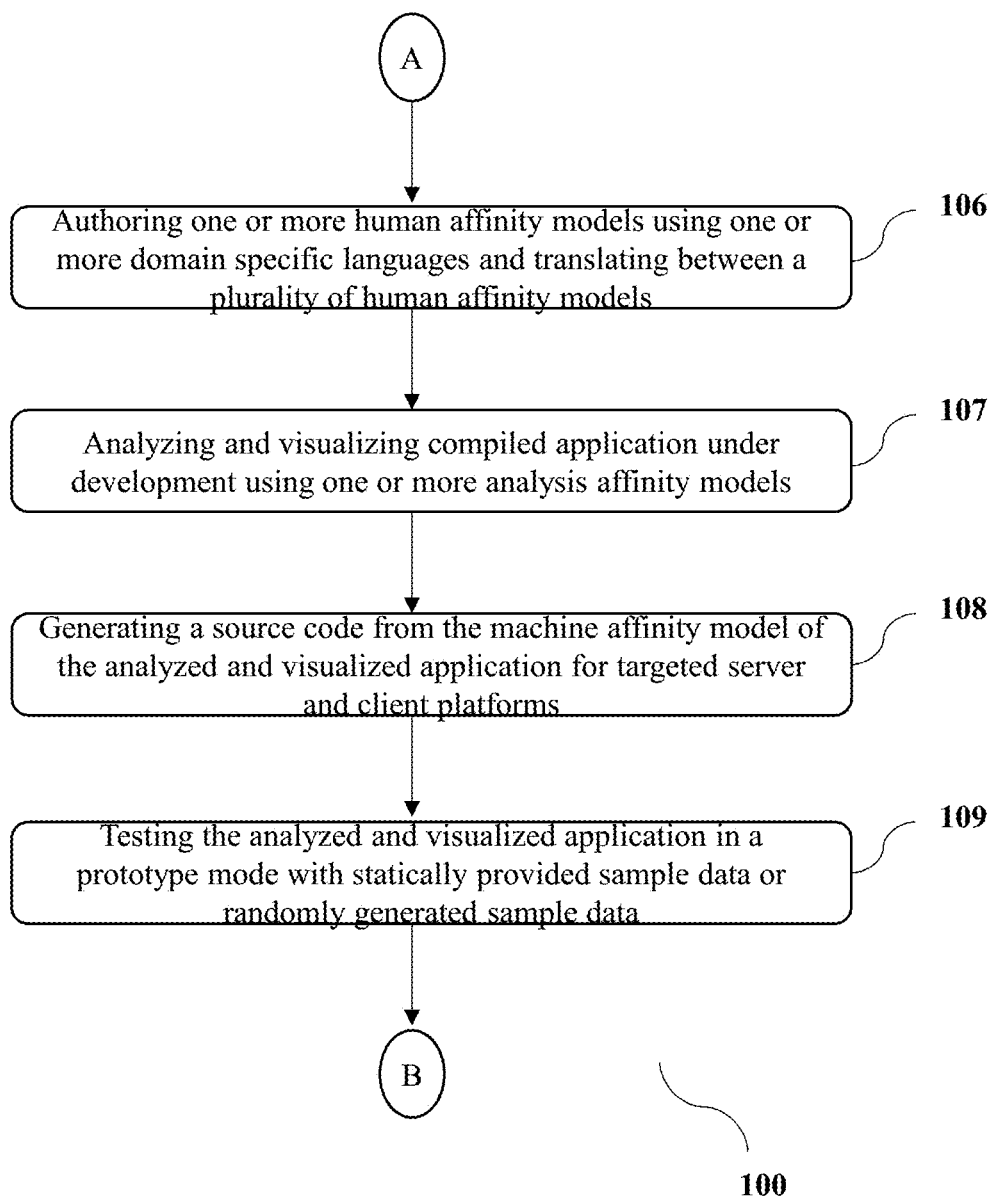
Figure 1C:
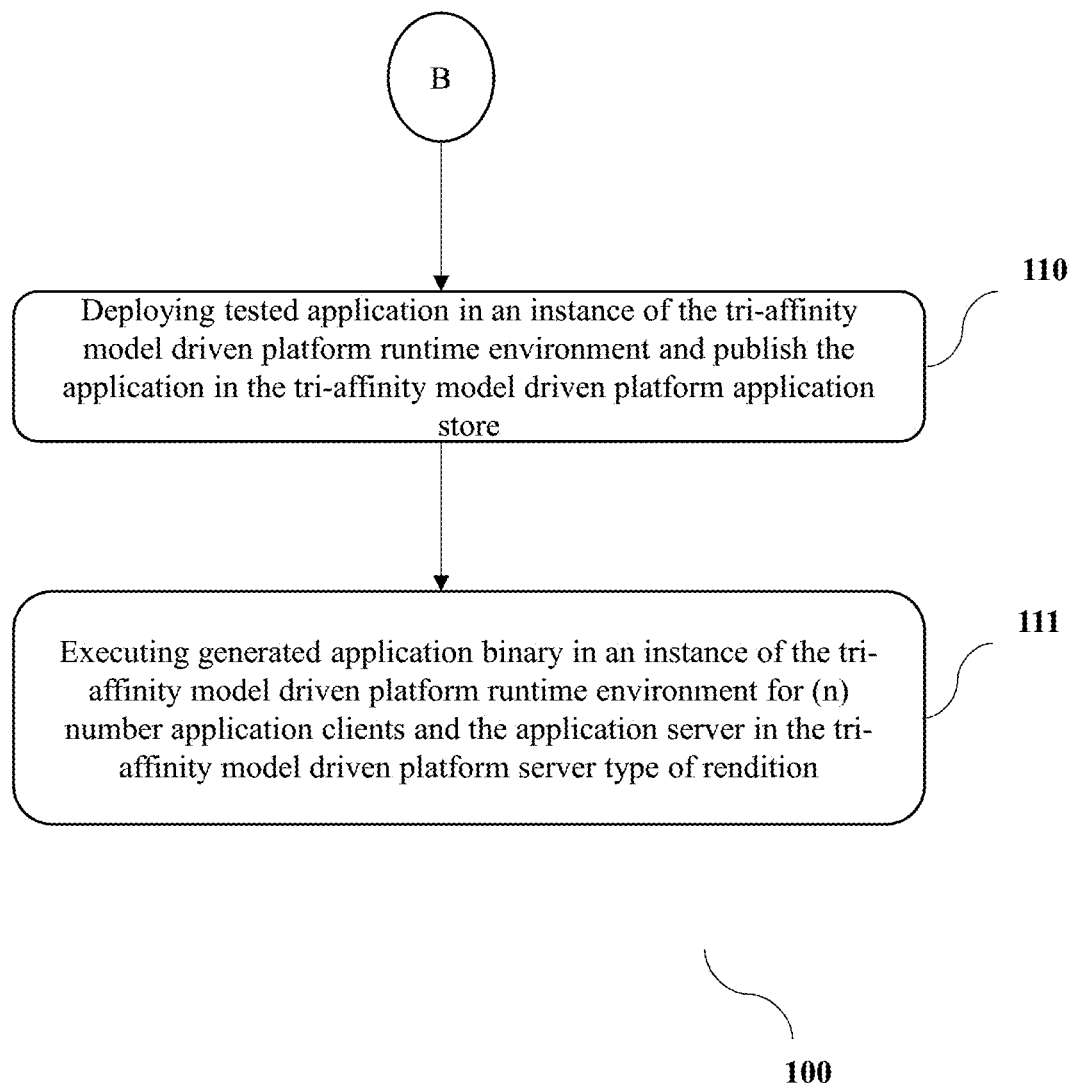

FIGS. 1A-1C illustrate a method for authoring, realizing, and analyzing a cross platform application using a tri-affinity model driven platform (TAMDP). The TAMDP has three affinities, namely, a human affinity intended for authoring by a human; a machine affinity intended for machine processing; and an analysis affinity intended for analysis. The human affinity, the machine affinity and the analysis affinity are expressed through a human affinity model, a machine affinity model, and an analysis affinity model respectively, with corresponding tooling and infrastructure of the TAMDP comprising a tri-affinity model driven development subsystem and a tri affinity model driven runtime subsystem for developing, analyzing during development, prototyping using sample data, introspecting, deploying, executing, managing, recording usage of a cross platform application, analyzing, and enhancing the cross platform application post deployment.

Predefined canonical meta-models comprising multiple attributes for describing and analyzing a cross-platform application comprehensively excluding domain logic are provided as a part of the tri-affinity model driven platform (TAMDP). For developing the cross-platform application, the TAMDP excludes domain logic. For running the cross-platform application, the TAMDP includes execution of the domain logic. The predefined canonical meta-models comprise, for example, an application (app) meta model for specifying application wide aspects, a namespace meta-model for specifying name spacing aspects, a configuration (config) meta-model for specifying configuration aspects, a locale meta-model for specifying localization aspects, an activity meta-model for specifying entry points and corresponding access control aspects, a service meta model for specifying service aspects, a data meta-model for specifying data aspects, and a user interface metamodel for specifying user interface aspects as disclosed in the detailed description of FIG. 3. The app meta-model, the namespace meta-model, the config metamodel, the locale meta-model, the activity meta-model, the service meta model, the data meta-model, and the user interface meta-model are comprehensive in terms of aspects cross-platform application. The predefined canonical meta-models provide for entire application realization excluding domain logic. The cross platform applications realized by the predefined canonical meta-models are comprehensive in terms of features comprising, for example, application (app) stores, application programming interfaces, execution as a server application across platforms, execution as a client application across platforms, generation of notifications, authentication, authorization, etc. The predefined canonical meta-models support multiplicity of server renditions and client renditions of the cross-platform application, for example, on smartphone platforms such as Android®, iOS, Windows®, etc., internet of things (IoT) platforms such as Arduino®, Raspberry®, etc., auto dashboards, etc.

Corresponding to each of the predefined canonical meta-models, analysis affinity metamodels are derived from the predefined canonical meta-models. The analysis affinity meta-models are one-time hand authored to correspond to the predefined canonical meta-models. An embodiment of the analysis affinity meta-model is an application ontology comprising all the aspects of the predefined canonical meta models. The multiple aspects, for example, user interface, data, service, activity, etc., are modeled as distinct ontologies. For a specific application, the data carried in the machine affinity model is transformed into a suitable form for performing an analysis such as subject-predicate-object constructs. In an embodiment of the analysis affinity model in semantic web technology, query technologies such as resource description framework (RDF) data query language (RDQL), SPARQL protocol and RDF query language (SPARQL) are used to codify pre-set queries as well as support ad-hoc querying by providing a query editor and an execution method combined with a results pane. Corresponding to each of the predefined canonical meta-models, human affinity meta-models are derived from the predefined canonical meta-models. The human affinity meta-models are one-time hand authored and designed as a domain specific language to correspond to the predefined canonical metamodels. An embodiment of the human affinity meta-model is A Language for Application (Alfa) comprising all the aspects of the predefined canonical meta-models. The machine affinity model is compliant with the predefined canonical meta-models. Similarly, the analysis affinity model is compliant with the analysis meta-model. In an embodiment, the human affinity model, the machine affinity model, and the analysis affinity model are separate and distinct. In another embodiment, the machine affinity model and the analysis affinity model are the same. In another embodiment, the analysis affinity model is generated from the human affinity model.

The human affinity model has a transformation from and to a machine affinity model. A domain specific modeling language, such as Alfa, allows human application developers to author the human affinity model for the application. A domain specific modeling language, such as Alfa, is a human entry point for creation and modification of a human affinity model of an application. A domain specific language, such as Alfa, is expressly designed with amenability for authoring a human affinity model using high abstraction human language like primitives for conversion to a human affinity model of an application. The human affinity model manifests an application comprehensively, that is, all aspects, all rendering types, all platforms, and all features. A human uses a domain specific language, such as Alfa, which is a highly abstract and expressive human-like language to author the human affinity model. A domain specific language, such as Alfa, allows developers to author the applications once, and have the applications rendered on any number of target platforms. A human affinity model of an application is optionally translated to another human affinity model of the same application using a translation process, such as translation of a human affinity model authored by a developer using a domain specific language, such as Alfa, in a specific vernacular spoken language, such as English, to another human affinity model of the same application using a domain specific language, such as Alfa, in another vernacular spoken language, such as German, using a translation process.

The machine affinity model allows a machine, or a machine based software system to play the role of a generator for realization of the application. The machine affinity model allows machine processing of the application specification. The machine affinity model is also a third party machine entry point for creation and modification of the application specification. The outcome of application specific human affinity modeling is input to an automated transformation that outputs the machine affinity model. The machine affinity model is an application specific instance of a meta-model. In an embodiment, the machine affinity model is considered a platform independent model. The machine affinity model is suited for processing by a machine. The processing involves operations comprising, for example, parsing, code generation, model transformations, etc. The machine affinity model drives the application realization following model driven engineering principles.

An automated transformation of the machine affinity model outputs the analysis affinity model. The analysis affinity model allows application owners and managers to play the role of an analyst of the application during development and runtime phases of the application. The analysis affinity model enables development and runtime analysis of the application. The analysis affinity model is expressly designed for analysis with intent to introspect and improve the application during development and runtime phases of the application. By design, the analysis affinity model is not an entry point for creation and modification of the application specification. That is, the analysis affinity model is not intended for authoring or editing of an application specification. The analysis affinity model is suited for performing various analyses during development and/or runtime.

The tri-affinity model driven development subsystem comprises a compiler, a translator, a model-to-model transformer, a model-to-text transformer, a model-to-source code generator, build tooling, and a development time analyzer and visualizer. The compiler compiles the human affinity model, that is, the definition of the application in the Alfa domain specific language to a machine affinity model. The translator optionally translates a human affinity model to another human affinity model. The model-to-model transformer performs model-to-model transformation of the machine affinity model to the analysis affinity model. The model-to-text transformer tool performs a model-to-text transformation of the machine affinity model to the human affinity model, that is, the source code in the Alfa domain specific language. The model-to-source code generator receives the machine affinity model, that is, a platform independent model, as input and outputs a platform specific model, that is, the platform specific source code. The model-to-source code generator generates source codes for a target specific server platform and a target specific client platform from the machine affinity model. The build tooling builds binary executables from the generated source codes for the target specific server platform and the target specific client platform, which can subsequently be deployed and installed on target specific server runtime and client platforms. In an embodiment, the tri-affinity model driven platform (TAMDP) subsystem compiles the human affinity model to the machine affinity model, generates a platform specific source code from the machine affinity model, and builds a platform specific server binary and platform specific client binaries from the platform specific source code. In another embodiment, the TAMDP subsystem compiles the human affinity model to a platform specific source code and builds a platform specific server binary and platform specific client binaries from the platform specific source code. In another embodiment, the TAMDP subsystem directly compiles the human affinity model to a platform specific server binary and platform specific client binaries. The TAMDP subsystem initiates the binary generation process after the source code generation process. The development time analyzer and visualizer performs various development-time analyses using the analysis affinity model. The tri-affinity model driven runtime subsystem comprises a runtime analyzer and visualizer for performing various runtime analyses using the analysis affinity model, and a runtime logger for collecting runtime operational data for performing various runtime analyses using the analysis affinity model. The TAMP runtime subsystem further comprises a machine learning based recommendation engine for generating machine learning based recommendations for application enhancement.

In the method disclosed herein as exemplarily illustrated in FIGS. 1A-1C, the tri affinity model driven platform (TAMDP) provides 101 predefined canonical meta models with descriptive attributes. The tri-affinity model driven platform (TAMDP) also derives 102, 103 one or more non-canonical meta-models for human affinity and one or more non-canonical meta-models for analysis affinity from predefined canonical meta-models. The tri-affinity model driven platform (TAMDP) also creates 104 an instance of an application model for a specific application by setting values of descriptive attributes of the predefined canonical meta-models using multiple modes of input, for example, as a human affinity model using a domain specific language, such as Alfa or as a machine affinity model created using external facilities. In an embodiment, the TAMDP receives input values of the descriptive attributes in a human affinity mode to create an instance of the human affinity model using the Alfa domain specific language. The Alfa domain specific language is an external domain specific textual modeling language, and not a general programming language. The application developer hand authors the application using the Alfa domain specific language as a source code text file on a file system. The compiler then compiles the source textual model, that is, the source code text in the Alfa domain specific language to a machine affinity model that is an instance of the predefined application meta-model with the values of the descriptive attributes. The human affinity model, that is, the source code text in Alfa, in a specific vernacular spoken language, such as English, is optionally translated to another human affinity model, that is, source code text in another vernacular spoken language, such as German, using a translation process.

In an embodiment, the tri-affinity model driven platform (TAMP) provides a combined compiler and model-to-source code generator that is made accessible as a compiler-cum-generator system on a cloud system, and offers facilities to compile a source program in the Alfa domain specific language, herein referred to as an "Alfa source program", and output a source code that can be rendered on a generated target platform, for example, a target client platform and a target server platform. The TAMDP, in this embodiment, comprises a system for controlled generation of a target platform source code, a method for qualifying and quantifying changes to the Alfa source program, and a method for operation based on selectable and/or changeable sensitivity parameters. In this embodiment, the components of the TAMDP comprise, for example, a developer workstation based editor tool such as a developer workstation, a cloud based common compiler tool for shared usage with concurrent usage, a cloud compiler-developer-workstation based command line interface (CLI) tool such as a development CLI, and a developer-workstation based native platform compiler tool such as a development native compiler. In this embodiment, the TAMDP enables various service configurations that allow a per developer limit of "n" applications (apps) in a given period, allow a per organization limit of "n" apps in a given period, where the organization has any number of developers, provide an ability to not retain the Alfa source program but still inform of malicious activity intended to breach set usage limits in the present and in the past, and provide an ability to share an evidence of detection of the malicious activity intended to breach set of allowances.

The method steps for usage of the compiler-cum-generator system on the cloud system comprise the following. The developer uses the development workstation to author the Alfa source program. The developer uses the development command line interface (CLI) to submit the authored Alfa source program to a cloud compiler over a network. The development CLI generates a compilation request, encrypts and/or signs the Alfa source program, and transmits the encrypted and/or signed Alfa source program to the cloud compiler over the network. The cloud compiler decrypts and/or verifies the received Alfa source program, compiles the submitted Alfa source program, generates the target platform source code with a controlled generation of the target platform source code using a first method disclosed below, and qualifies and quantifies changes to the Alfa source program using a second method disclosed below and operation performance based on selectable or changeable sensitivity parameters using a third method disclosed below. The cloud compiler transfers the generated target platform source code over the network to the development CLI on the developer workstation. The developer then uses the development native compiler to generate a target platform binary by providing the target platform source code as input.

In the first method, a target platform source code generator system operates in two source code generator modes comprising an obfuscated output mode and a non-obfuscated output mode. In the obfuscated output mode, source code elements, for example, screen identifiers, variable identifiers, subroutine or component identifiers, application programming interface (API) identifiers, user interface element identifiers, etc., are generated as "ID" prefix along with a suffix computed from a hash of the associated identifier with the intent to inhibit disallowed use of the generated target platform source code. In the second method, changes to the Alfa source program with the intent to qualify and quantify the Alfa source program as representing a known application or a distinct application are detected. An enumeration of detection parameters is provided along with properties stating whether an associated parameter is necessary and/or sufficient to qualify a change in this parameter as indicating a known application or a distinct application. A change in the Alfa source program is a deviation of a program source code element from its previous form as contained in a previous submission of the Alfa source program. A set of detection parameters is provided below:

(a) Application (app) specification parameters
(b) User interface (UI) specification parameters
(c) Data specification parameters
(d) Config specification parameters
(e) Locale specification parameters
(f) Service specification parameters
(g) Activity specification parameters
(h) Namespace specification parameters An algorithm executed by at least one processor of the compiler-cum-generator system is disclosed below:
given for each parameter
   enumeration of "non-identifier things"
qualify the change (if any)
   compute "change hash" of each parameter
     hash of most everything ("non-identifier things")
      except identifier "change hash" accumulated as
      key=value attribute in source/source-attachment
     ADDITIVE change indicated by
      "change hash" absent in source attachment
      corresponding item present in source
     SUBTRACTIVE change indicated by
      "change hash" present in source attachment
      corresponding item absent in source
     EDITIVE change indicated by
      "change hash" present in source attachment
      corresponding item present in program source
      "change hash" NOT equal to "computed change
       hash"
store (accumulative) hash, identifier
   store in a blockchain in one embodiment
   store embedded in program source (maybe as program
     source attachment) preamble-initiated-by-system In the third method, an operation is performed based on configurable sensitivity to the change of parameters. The third method is employed when a determination is to be made whether an operation can be performed on behalf of a human developer or other system developer based on allowances afforded to the developer and available for retrieval from a storage system. An algorithm executed by at least one processor of the compiler-cum-generator system is disclosed below:
if developer, fetch compile allowances from store
    allowances could be
    enumeration of target frontends
    count of target frontends
    backend
    etc.
    number of allowed distinct apps (ALLOWED-APPS-COUNT)
    example
        3 (distinct apps)
    active subscription unit period (ACTIVE-SUBSCRIPTION)
    example
        1 month (current month)
    number of consumed allowed distinct apps in active subscription unit period (CONSUMED-APPS-COUNT)
    example
        1 (distinct apps)
    list of consumed BASE URLs up to now in unit period (CONSUMEDBASE-URLS-LIST)
    example
        www.acme.com/app4servicecenter
        www.acme.com/app4workshop
        www.acme.com/app4repair
if organization-developer, fetch compile allowances from store (inherited from organization allowances)
    number of allowed distinct apps (ALLOWED-APPS-COUNT)
    example
        3 (distinct apps)
    active subscription unit period (ACTIVE-SUBSCRIPTION)
    example
        1 month (current month)
    number of consumed allowed distinct apps in active subscription unit period (CONSUMED-APPS-COUNT)
    example
        1 (distinct apps)
    list of consumed BASE URLs up to now in unit period CONSUMED-BASE-URLS-LIST)
    example
        www.acme.com/app4servicecenter
        www.acme.com/app4workshop
        www.acme.com/app4repair
quantify qualified changes
    if quantity of qualified changes is permitted (based on algorithm, heuristics), signal approval for performance of the operation
    if quantity of qualified changes is not permitted (based on algorithm, heuristics), signal denial for performance of the operation In an embodiment, the descriptive attributes in the machine affinity model allow for an extensibility of the instance of the application model to different target platforms. The extensibility mechanism comprises a key or a key-value pair that influences behaviour for any widget, data, service, or application aspect. The grammar or definition of the Alfa domain specific language provides an attribute clause of zero, one, or any combination of the following forms.
<attribute>
<attribute>=value>
<function>(<attributed=<value>

The attribute clause allows extensibility without the need to modify grammar of the Alfa domain specific language. The grammar or definition of the Alfa domain language allows extensibility at a site of use of a user interface element as disclosed below.

EditText named UNM;

During generation of the application model, the user interface (UI) element is tagged as a variant element. The tagging of the UI element results in the generation of a particular rendition of the UI element"EditText" during generation of the source codes. Furthermore, in the source code text in the Alfa domain specific language, at the site of use, a UI element is authored, for example, as disclosed below.

EditText variant=2 named UNM;

The generation of the user interface (UI) element variant for a target platform during generation of the application model comprises authoring the UI element in the Alfa domain specific language as <platform>(variant)=X. During generation of the application model, the UI element is tagged as a variant 2 UI element. The tagging of the UI element results in the generation of another rendition of the UI element "EditText" during generation of the source codes. The grammar or definition of the Alfa domain specific language allows, at a site of use, a UI element authored, for example, as.

EditText android(variant)=3 web(variant)=2 named UNK

During generation of the application model, the user interface (UI) element is tagged as a variant 3 UI element for Android® usage and a variant 2 UI element for web usage. The tagging of the UI element results in the generation of specific renditions of the UI element "EditText" during generation of the source codes per platform. One of the UI elements available to use when designing a page of the application is a "Data Determined Multilayout", hereafter referred to as "multilayout". Similar to other dynamically fetched data rendering UI elements, the multilayout UI element supports an optional "data" clause to specify a backend application programming interface (API) to target when data is to be fetched. The API returns data in the form of a model defined in a "model" clause. In the following example, the model is an "array of RatingItemDTO(s)". A "determinant" clause is used to specify an attribute in the model, for example, "Rating Status", whose value is to be compared with values enumerated in a "fragment refs" clause. If a matching value for the attribute of the model is found in the "fragment refs" clause, the UI layout corresponding to the matched value is used to render that row of data. That is, each row of data returned by the API carries an attribute whose value is used to select the UI layout to use to render that particular row of data. Any number of UI layouts can be specified, an example of which is disclosed below.

--- multilayout
        determinant RatingStatus
        fragment refs
            "Rated":JobCardRatedItem,
            "Unrater":JobCardUnratedItem
        model RatingItemDTO[ ]
        data ListJobCardRatingsService
        filtered
        named NIL_CustomerJobCardsRatings;

---

In an embodiment, the Alfa domain specific language allows creation of a specialization of the multilayout user interface (UI) element. The multilayout UI element allows for alternating the UI layout for odd and even positioned rows of data returned by the data application programming interface (API).

```
multilayout
    determinant zebra
    fragment refs
        "even":CategoryItemEven,
        "odd":CategoryItemOdd
    model CategoryMasterDTO[ ]
    data ListAllCategoryService
    filtered
    named ML_ViewCategoryMaster;
```

In an embodiment, the Alfa domain specific language allows creation of another specialization of the multilayout user interface (UI) element. The multilayout UI element allows for presenting multiple data rows in which grouped data rows are collapsed and can be expanded to reveal child data rows in that group. A UI layout for a parent data row and individual UI layouts for child data rows are specified as disclosed below.

```
multilayout
    determinant expandable
    fragment refs
        "parent":JobCardNoteItemParent,
        "Pickup Initiated":JobCardNoteItemChildPickupInitiated,
        "Pickup Aborted":JobCardNoteItemChildPickupAborted,
        "Pickup Handover":JobCardNoteItemChildPickupDone,
        "Pickup Received":JobCardNoteItemChildPickupReceived,
    model JobCardNoteItemDTO[ ]
    data jobCardNoteItemExpandableService
    filtered
    named ML5;
```

The Alfa domain specific language allows menu specifications to be abstracted to basic interface elements comprising, for example, menu items, labels for menu items, icons for menu items, etc. The abstraction allows use or reuse of menus specified in a common or singular method at all receptive positions, for example, a graphical user interface (GUI) rendition such as a side drawer, a springboard, an action bar, an interactive voice response system (IVRS) rendition, etc.

```
menu GlobalOptionsMenu {
    Home label home icon icon_home;
    Inbox label label_inbox icon icon_inbox;
    Drafts label label_drafts icon icon_drafts;
    About label label_about icon icon_about;
    SignOut label signout icon icon_logout:
}
```

In compliance with user interface (UI) design aesthetics and user experience design on some platforms, some UI elements are represented as instances of other agreeable UI elements. For example, when an application is targeted for the iOS, if there is a page that has a top level tab navigation as well as a side drawer navigation, the side drawer is removed on the fly and the menu items in the side drawer are subsumed under the top level tab menu.

User interface (UI) elements, for example, non-form-control UI elements display tag like information overlaid on the UI element. In an embodiment, the position of the tag like information is specified along with the content to be displayed. The data corresponding, for example, to positioning, content, etc., is statically provided to the tri-affinity model driven platform (TAMDP) as disclosed in the following example.

badge="[New|topleft|triangle|0xFF0000AA]";

In an embodiment, the data corresponding, for example, to positioning, content, etc., is supplied via binding of data returned by an application programming interface (API). Using the Alfa domain specific language specific to the user interface (UI) elements and the APIs, the tri-affinity model driven platform JAMDP) implements a generic chat facility as a collection of graphical user interface (GUI) pages and a set of APIs. The chat facility may be placed into any application developed by the TAMDP. APIs selected by an application developer can be surfaced for invocation during a chat session. The chat session includes other human participants, resulting in a group chat in which one of the participants would be the application responding to chat message-based API invocations such as the following.

```
locale {
    "en" default {
        strings {
            .
            .
            command_ListAllCustomersService: "list customers";
            .
            .
        }
    }
}
process ListAllCustomersService
    .
    .
    chat(command)=command_ListAllCustomersService
```

In the above example, the application programming interface (API) "ListAllCustomersService" is invoked by a human participant during a chat session by typing a word sequence "list customers". During a chat-based API invocation, parameter passing, and form data entry are feasible. Notifications are asynchronous one-way messages sent by an application server-side. In an embodiment, in the Alfa domain specific language, APIs chosen by the application developer generate notifications. Notifications are sent using different modes comprising, for example, a short message service (SMS), an electronic mail (email), a device push notification, a voice call, third party messaging applications such as WhatsApp® of WhatsApp Inc. Only for the device push notification mode, a feature of "inbox" is supported. An inbox is a store of received device push notifications. Notifications are directed to specific named inboxes. In the Alfa domain specific language, user interface (UI) pages can be created and designated as "inbox" pages, allowing unread and read notifications to be shown on these pages, for example, as disclosed below.

```
page ServiceRequestNotificationInbox inbox {
    .
    .
```

Complex user interface (UI) elements that render multiple rows of data support a filter feature. If a "filtered" attribute is specified in the use of the UI element, the UI includes a technique for an end user to enter text that is used to filter rows shown in the UI element. If the "filtered" attribute is specified along with a list of attributes present in the data model specified in the UI element, in the use of the UI element, the UI implements a method to allow the end user to enter text that is used to filter rows based on specified data model attributes only. Complex UI elements that render multiple rows of data also support an endless scroll feature for fetching subsequent rows of data beyond those that are currently visible. To enable the endless scroll feature, the application programming interface (API) for data fetch specified in the UI element must include a parameter named "page" as disclosed below.

```
process LastViewedCustomersService
.
endpoint "/customers/lastviewed?page={page}"
.
;
```

The application programming interface (API) implementation must provide paginated results given the "page" parameter. The user interface (UI) element works in tandem with the API to present the endless scroll feature without further intervention by the application developer. Furthermore, the tri-affinity model driven platform (TAMDP) also generates complex UI elements, for example, a shopping cart element using the Alfa domain specific language. The Alfa domain specific language allows for synthesis of complex widgets, for example, a shopping cart. An algorithm executed by at least one processor of the tri-affinity model driven platform (TAMDP) for synthesizing complex widgets, for example, complex UI elements is disclosed below:
(1) Given that a specific target client platform provides "n" user interface (UI) elements,
(2) The Alfa domain specific language provides a choice of n+m UI elements to the application developer.
(3) The "m" UI elements would typically be complex and highly abstracted (for example, a "shopping cart") and to realize the "m" UI elements would require a composition of multiple simple UI elements.
(4) As the "m" UI elements do not exist in the underlying target client platform, during compilation, UI elements from the set "n" are synthesized in an appropriate composition in lieu of the corresponding "m" UI elements.

In an embodiment, the attributes in the machine affinity model allow specification of an application (app) store to privately or publicly publish the generated application. In an embodiment, the application developer authors, in the Alfa application source program, the app stores provided by the tri-affinity model driven platform (TAMDP) runtime infrastructure in which the generated application must be hosted, by reciting whether to privately or publicly publish the generated application in the app store. In an embodiment, the attributes in the machine affinity model allow synthesis of complex widgets while creating an instance of the application model. The widgets comprise items, for example, a data determined multi-layout element with zebra, expandable features, variants of the multi-layout element, a menu element, a tab menu element, a chat user interface element, a topical inbox element, a shopping cart element, pagination such as an endless scroll, a filter-all attribute, a filter-selective attribute, a drafts attribute, a badging attribute, responsive layouting using condition expressions, widget variants and platform-specific rendition variants that morph into a specific rendition based on the target platform.

In an embodiment, the tri-affinity model driven platform (TAMDP) receives input values of the attributes in a machine affinity mode, that is, from external facilities to create an instance of the machine affinity model. The TAMDP receives input values of the attributes, for example, via a visual editor or a voice user interface, or a chat hot, or a what-you-see-is-what-you-get (WYSIWYG) authoring tool, or a multi-mode interactive authoring tool in a machine affinity mode to create an instance of the machine affinity model. A chat bot provides a chat-based interface for building applications. The chat bot is deployed with an additional feature that allows message exchanges using voice in addition to or in lieu of typed chat messages. The application developer interacts with the chat hot over multiple chat sessions to build an application. The chat bot assisted creation of the application is depicted in one or more side panels on a graphical user interface (GUI) of the TAMDP. The creation of the application is performed on the fly via the Alfa domain specific language generated by the chat bot or by running a WYSIWYG rendition of the application generated by the chat hot. The interaction with the chat bot is in a question and answer (Q & A) format, wherein questions are initiated by the chat hot and answered by a human application developer, for example, as disclosed in the following sequence.

ChatBot»What is the name of your App?
Human App Dev»ShoppingApp
ChatBot»Do you want to add a page?
Human App Dev»Yes
ChatBot»What do you want to name the page?
Human App Dev»Signin
ChatBot»Do you want to add an API?
Human App Dev»No
ChatBot»Do you want to add a data entity?
Human App Dev»No In an embodiment, the interaction is in an instructional format as disclosed below, wherein the human application developer issues a sequence of instructions to build a page, or a data entry, or an application programming interface (API), etc.

Human App Dev»Let me instruct you about the Signin page
ChatBot»Ok
Human App Dev»Add a Button UI element
Human App Dev»Add two Label UI elements
Human App Dev»When the Button is clicked, Segue to page named Main In an embodiment, to create an instance of the machine affinity model, the tri-affinity. model driven platform (TA-NIDP) receives partial input values of the attributes from external low or high-fidelity screen diagrams, and an external textual representation of an application, for example, an extensible markup language (XML) file.

The tri-affinity model driven platform (TAMDP) compiles or transforms 105 the created instance of the application model to achieve the three affinity models, that is, the human affinity model, the machine affinity model, and the analysis affinity model, required for application development and deployment. The compiler compiles the application model created in the human affinity mode with the Alfa domain specific language to a corresponding instance of the machine affinity model. The compiler that is configured as a model generator, uses a model-to-model transformation to convert the application authored as an Alfa source program to the machine affinity model compliant with one or more of the predefined canonical meta-models, for example, the eight meta-models comprising the application (app) meta-model, the namespace meta-model, the configuration (config) meta-model, the locale meta-model, the activity meta-model, the service meta-model, the data meta-model, and the user interface meta-model. The compiler performs syntax checking followed by an elaborate reference checking to pre-empt errors in downstream native builds and outputs persistent textual representations of application models of various aspects of the application that are compliant with the various aspect-specific predefined canonical meta-models. The compiler possesses a tinting capability, that is, provides warnings and suggestions about applicability of statements and clauses in the Alfa domain specific language to the target platform of the generated application, for example, an Android® smartphone platform, the Arduino® internet of things (IoT) platform, etc. The model-to-model transformer transforms the machine affinity model of the application to the analysis affinity model.

The tri-affinity model driven platform also authors 106 one or more human affinity models using one or more domain specific languages and translating between a plurality of human affinity models. The tri-affinity model driven platform (TAMDP) allows bidirectional editing of a created instance of the application model coded in the Alfa domain specific language, if the created application model is edited or created, for example, through a what-you-see-is-what-you-get (WYSIWYG) authoring tool, chat bots, a voice user interface (VUI), external low or high fidelity screen diagrams, etc. The TAMDP allows round-tripping between the human affinity model coded in the Alfa domain specific language and the machine affinity model, if the machine affinity model is edited or created through multiple modes, for example, the WYSIWYG authoring tool, a multi-mode interactive authoring tool, chat bots, an interactive voice response system (IVRS), external low and/or high fidelity screen diagrams, and an external textual representation such as an extensible markup language (XML) representation of the application. The roundtripping between the human affinity model and the machine affinity model allows the TAMDP to use different editors to edit the machine affinity model and maintain the human affinity model and the analysis affinity model in sync. The TAMDP therefore supports the generation of the human affinity model from the machine affinity model, and the generation of the machine affinity model from the human affinity model.

The development time analyzer and visualizer analyzes and visualizes 107 the application under development using the analysis affinity model. The development time analyzer and visualizer acting on the analysis affinity model during the development of the application analyzes and visualizes navigation paths across the application being generated by role, usage of a particular user interface element across the application, usage of a particular service across application, inboxes in the application, pages in the application, data collection forms in the application, services in the application, device native features used in the application along with information on the user permissions required to operate the device native features, data entities, and the sources of the data entities in the application. The development time analyzer and visualizer warns and provides applicability of the attributes in the machine affinity mode to the target platform of the generated application. The development time analyzer and visualizer determines business activities. An algorithm defined in the development time analyzer and visualizer and executed by at least one processor of the tri-affinity model driven platform (TAMDP) for determination of the business activities is disclosed below.
  (1) Enumerate all the pages in the application—Set(A)
  (2) Enumerate all the roles in the application—Set(R)
  (3) Iterate Set(A), filtering all the pages that have an incoming segue from the main page—Set(B)
  (4) For each page in Set(B) recursively collect pages that are targets of outgoing segues for each role. This results in a set of activities by role. The first activity in the activities is the entry point page to the activity.
  (5) This derived activity information is used for analysis and visualizations about business activity flow and usage.
  (6) Present the collected data.

An algorithm defined in the development time analyzer and visualizer and executed by at least one processor of the tri-affinity model driven platform (TAMDP) for visualizing navigation paths across pages of the application is disclosed below.
  (1) Start with the page named "Main".
  (2) Determine all outgoing segues from the Main page noting the destination page.
  (3) Plot the source page and destination page with a connecting arc.
  (4) Recursively repeat step 2 and 3 for every destination page found in step 2.
  (5) Present the collected data.

An algorithm defined in the development time analyzer and visualizer and executed by at least one processor of the tri-affinity model driven platform (TAMDP) for visualizing navigation paths across pages by role is disclosed below.
  (1) Enumerate all roles in the application.
  (2) For each role, perform the next steps.
  (3) Start with the page named "Main".
  (4) Determine all outgoing segues for role in hand from the Main page noting the destination page.
  (5) Plot the source page and destination page with a connecting arc.
  (6) Recursively repeat step 4 and 5 for every destination page found in step 4.
  (7) Present the collected data.

An algorithm defined in the development time analyzer and visualizer and executed by at least one processor of the tri-affinity model driven platform (TAMDP) for visualizing usage of a particular user interface (UI) element type across the application is disclosed below.
  (1) Enumerate all pages in the application.
  (2) For each page, perform the next steps.
  (3) For the parts of the page, collect usage instances of the given UI element.
  (4) Present the collected data.

An algorithm defined in the development time analyzer and visualizer and executed by at least one processor of the tri-affinity model driven platform (TAMDP) for visualizing usage of a particular service across the application is disclosed below.
  (1) Enumerate all services in the application.
  (2) Iterate all services, noting the service if match is found and service is to enabled for notification or synchronization.
  (3) Enumerate all pages in the application.
  (4) For each page, perform the next steps,
  (5) For the parts and constraints of the page, note usage of service if match is found.
  (6) Present the noted data.

An algorithm defined in the development time analyzer and visualizer and executed by at least one processor of the tri-affinity model driven platform (TAMDP) for visualizing the inbox pages in the application is disclosed below.
  (1) Enumerate all pages in the application.
  (2) For each page, perform the next steps.
  (3) If the page contains "inbox" attribute, make note of it.
  (4) Present the noted data.

An algorithm defined in the development time analyzer and visualizer and executed by at least one processor of the tri-affinity model driven platform (TAMDP) for visualizing the pages in the application is disclosed below.
(1) Enumerate all pages in the application.
(2) For each page, perform the next step.
(3) Make note of it.
(4) Present the noted data.

An algorithm defined in the development time analyzer and visualizer and executed by at least one processor of the tri-affinity model driven platform (TAMDP) for visualizing the data collection forms in the application is disclosed below.
(1) Enumerate all pages in the application.
(2) For each page, perform the next steps.
(3) For the parts of the page, collect usage instances of form user interface (UI) element
(4) Present the collected data.

An algorithm defined in the development time analyzer and visualizer and executed by at least one processor of the tri-affinity model driven platform (TAMDP) for visualizing the services in the application is disclosed below.
(1) Enumerate all services in the application.
(2) For each service, perform the next step.
(3) Make note of it.
(4) Present the noted data.

An algorithm defined in the development time analyzer and visualizer and executed by at least one processor of the tri-affinity model driven platform (TAMDP) for visualizing the device native features used in the application along with information on the user permissions required to operate the device native features is disclosed below.
(1) Enumerate all pages in the application.
(2) For each page, perform the next steps.
(3) Make a note of call components that integrate with a device native feature.
(4) Make a note of user interface (UI) elements that integrate with the device native feature.
(5) Present the noted data.

An algorithm defined in the development time analyzer and visualizer and executed by at least one processor of the tri-affinity model driven platform (TAMDP) for visualizing the data entities and their sources in the application is disclosed below,
(1) Enumerate all data entities in the application.
(2) For each data entity, perform the next step.
(3) Collect information about source System-of-Record (SoR) (if any). Make note of it.
(4) Present the noted data.

With the development time analyzer and visualizer, application authors and domain users can interact with the design of the application, navigation paths across the application, access controls, the usage of data elements, and application programming interface (API) use, and determine the closeness of the application design to their requirement from the application, and fine tune the application model to suit their requirement completely.

The tri-affinity model driven platform (TAMDP) generates 108 a source code of the application for a targeted platform, for example, a targeted server platform or a targeted client platform, to be rendered as one of many rendering types using the created or compiled instance of the machine affinity model. The rendering types comprise, for example, a client side of the application only, a client side of N applications and a server side of one application, a server side of one application only, a client side of N applications with a server side of a third party application, and a server side of a third party application only. The TAMDP generates one or more platform specific source codes using the model-to-source code generator based on model driven engineering methods.

The tri-affinity model driven platform (TAMDP) generates a source code for the server side of the application for rendering on servers of different types comprising, for example, a single instance hosted application server side, a platform as a service (PaaS) application server side such as the Salesforce® App Cloud of salesforce.com, Inc., a mobile backend as a service (mBaaS) application server side such as Microsoft Azure® of Microsoft Corporation, a serverless application server side such as AWS® Lambda of Amazon Technologies, Inc. The TAMDP generates a source code for the client side of the application for rendering on clients of different types comprising, for example, Android® phones, iOS phones, Android® devices, iOS devices, desktop web browsers, mobile web browsers, automobile dashboards, smart watches, smart devices, internet of things (IoT)-device hosted clients, voice user interfaces of interactive voice response systems, Braille input and output user interfaces, etc.

An application developer specifies a "backend" clause in the "app" sentence for the server-side rendition in the application specification. In the absence of the "backend" clause, the generation of application server-side defaults to the tri-affinity model driven platform (TAMDP). In an embodiment, the "backend" clause is used to specify any of a preset list of supported third party backends. The application developer also specifies a "frontend" clause in the "app" sentence for the client-side rendition in the application specification.

An algorithm defined in the model-to-source-code generator and executed by at least one processor of the tri-affinity model driven platform (TAMDP) for extending the same application for different rendering types and different form factors of the graphical user interface (GUI) is disclosed below.
(1) Enumerate all pages in the application.
(2) For each page, perform the following.
(3) Enumerate user interface (UI) elements having properties that are mutable conditionally.
(4) Evaluate condition elements filtering out those not matching with conditions influenced by environmental factors such as screen size, device form factor, time, date, and geo-position.
(5) Generate conditional code to evaluate the condition at runtime to perform determination based on prevalent environmental factors. The determination may result in mutation of properties such as "visibility", "height", "width", etc.

The model-to-source code generator generates an auto-badging code for generating a platform specific source code for rendering on clients of different types using the machine affinity model. An algorithm defined in the model-to-source code generator and executed by at least one processor of the tri-affinity model driven platform (TAMDP) for generating the auto-badging code is disclosed below.
(1) Enumerate all pages in application.
(2) Filter pages by those having an "inbox" attribute.
(3) For each page, perform the following steps.
(4) Determine an outgoing segue (if any) that navigate to a page designated as an "inbox" page.
(5) Determine an event corresponding to the segue action.
(6) Determine the user interface (UI) element corresponding to the event.

(7) Generate auto-badging for inboxes code so that a count of unread messages in the inbox is reflected in an automatically applied badge on all menu options that navigate to the particular inbox page.

The tri-affinity model driven platform (TAMDP) generates a platform specific server source code and one or many platform specific client source codes corresponding to the machine affinity model of the application. The TAMDP builds the platform specific server source code and the platform specific client source code of the application into a platform specific server binary and platform specific client binaries respectively, using the build tooling provided by the TAMDP development subsystem and the build tooling provided by specific native platforms, for example, Android®, iOS, etc. In an embodiment, the TAMDP generates a platform specific server source code of the application using the machine affinity model of one of the many server rendering types prior to generating the binary code. In another embodiment, the TAMDP generates a platform specific client source code of the application using the machine affinity model of one or more of the many client rendering types prior to generating the binary code. The TAMDP generates a platform specific server binary code of the application using the platform specific server source of one of the many server rendering types. In another embodiment, the TAMDP generates one or many platform specific client binary codes of the application using the platform specific client source of one or many of the server rendering types.

The tri-affinity model driven platform (TAMDP) receives statically provided sample data or randomly generated sample data from an application developer and runs the application in a prototype mode. The TAMDP tests 109 the application in a prototype mode with the statically provided sample data or the randomly generated sample data. The application developer triggers the TAMDP to run the generated application as a prototype with sample data, either as a set of static values or as a set of randomly generated values in a "data" clause of the respective user interface (UI) element. The application developer shares the prototype application with an intended user audience to obtain validation and feedback prior to deploying the application into production. The application developer deploys 110 the application in an instance of the TAMDP runtime environment and publishes the application in a TAMDP application store.

An introspection chat bot provided on a user interface, for example, a site of the tri-affinity model driven platform (TAMDP) application store introspects the application in a TAMDP server type of rendition for suitability and applicability of the application for usage by users. The introspection chat hot answers questions asked by a human user at a pre-install stage, a post-install stage, a pre-login stage, and a post-login stage. As an example, at the pre-install stage, the human user interacts with the introspection chat bot as disclosed below.

Human User»What is the name of this App?
Introspection ChatBot»Field Service App
Human User»Who owns the App?
Introspection ChatBot»app4servicecenter.com
Human User»What are the options available in this App?
Introspection ChatBot»This app allows you to submit a device for repair, see the past history, call the call center of the repair shop, and track your service request.
Human User»Does this app collect any privately identifiable information?
Introspection ChatBot»This app collects your phone no. and your address for service delivery purposes. This app collects your credit card information if you wish to store the credit card details. You may choose to opt-out and not store the credit card information.
Human User»Does this app have images?
Introspection ChatBot»This app has images on its landing page and its sidebar, the min navigation interface. It has icons at other places.
Human User»What is the size of the App?
Introspection ChatBot»60 MB for Android, 80 MB for iOS As an example, at the post-install stage of the application on a client device, the human user interacts with the introspection chat hot as disclosed below.

Human User»What features of my device does this App use?
Introspection ChatBot»This app allows you to take pictures from your device based camera and send them as a part of a service request. You can choose to attach pictures from your gallery.
Human User»Does this app track my location?
Introspection ChatBot»This app tracks your location for service delivery purposes.
Human User»Which features do not work for me?
Introspection ChatBot»As your phone does not have a GPS, the map feature which directs you to the nearest service center, will not work.
Human User»Does this app work offline?
Introspection ChatBot»You have chosen to not allow access to your device data store. This app will not work offline for you. If you wish it to work, you can grant access to your device data store, and it will work.
Human User»Does this app have access to my images?
Introspection ChatBot»Yes. This app has been provided access to the images stored in the gallery.

As another example, at the post-install stage and the post-login stage, the human user interacts with the introspection chat bot as disclosed below.

Human User»What is my role?
Introspection ChatBot»You have the role of a registered customer.
Human User»Does this app have access to my images?
Introspection ChatBot»Yes. This app has been provided access to the images stored in the gallery.
Human User»How many times have I used the service request submit in the past?
Introspection ChatBot»You have submitted the service request form 5 times from the date of installation.
Human User»When was the first service request created?
Introspection ChatBot»The first service request form was submitted on 15 Aug. 2017.

The tri-affinity model driven platform (TAMDP) executes 111 the generated application binary in an instance of the TAMDP runtime environment for N application clients and the application server in the TAMDP server type of rendition. The TAMDP publishes a representational state transfer (REST)-like or a simple object access protocol (SOAP) application programming interface (API) based on the values of the attributes of the machine affinity model. The TAMDP duplicates or refactors the generated application binary for all possible topologies of client and server renditions.

The tri-affinity model driven platform (TAMDP) runtime subsystem comprises a server runtime, a runtime notification server, a runtime synchronization server, a runtime identity and authorization server, and a runtime analytics server. The TAMDP runtime subsystem hosts the generated server-side application binary and hosts the TAMDP application store containing the generated client-side binary. The application users download the application client-side binary on their client devices. The server side surfaces the application programming interfaces (APIs) generated by the generated server side. The runtime notification server, the runtime synchronization server, and the runtime identity and authorization server perform actions as specified in the application model, that is, the machine affinity model or the human affinity model. The TAMDP runtime subsystem allows connection of the generated application to multiple data sources using different connectors.

The runtime notification server of the tri-affinity model driven platform (TAMDP) runtime subsystem generates notifications related to the generated application in runtime per application programming interface (API) basis across the N clients using a send-to-role hierarchy or a send-to-role hierarchy based on user content, notification frequency, and notification method specified in the application model. The attributes in the machine affinity model allows generation of notifications per user based on an option for opt-in and opt-out of the notifications on the clients. A process statement in the Alfa domain specific language specifies an application programming interface (API). In an embodiment, an optional clause that provides notification related details comprising, for example, "per user content", notification frequency by way of a cron expression, one of multiple notification methods, etc., in the Alfa domain specific language is specified in the process statement. The notification methods comprise, for example, electronic mail (email), a short message service (SMS), a device push notification, a voice call, a third party messaging application such as WhatsApp®.

The tri-affinity model driven platform (TAMDP) uses the notifications related details to generate a code that performs a notification dispatch on a per API basis across multiple client devices used by an end user of the application. In an embodiment, the Alfa domain specific language comprises process statements having a notification clause with any combination of the notification methods disclosed above. In another embodiment, the Alfa domain specific language comprises process statements having a notification clause with a sub-clause specifying whether the end user can opt-in or opt-out of the notification. In another embodiment, the Alfa domain specific language comprises process statements having a notification clause with a sub-clause specifying whether a notification payload is to be generated once for all end users who would be the recipients of the notification, or whether a notification payload is to be generated per user so that the notification payload may vary due to use of the end user context in the content generation.

The runtime notification server sends notifications per application programming interface (API) basis across the N clients using the send-to-role. An algorithm executed by at least one processor of runtime notification server of the tri-affinity model driven platform (TAMDP) runtime subsystem for sending these notifications is disclosed below.

(1) Collect notification payload.
(2) Collect role-name to which notification is to be sent.
(3) Enumerate all application users belonging to role-name.
(4) Send notification for each user.

The runtime notification server sends notifications per application programming interface (API) basis across the N clients using the send-to-role hierarchy. An algorithm executed by at least one processor of the runtime notification server of the tri-affinity model driven platform (TAMDP) runtime subsystem for sending these notifications to a subordinate or senior is disclosed below.

(1) Collect notification payload.
(2) Collect role-name and hierarchy direction (Subordinate/Senior) to which notification is to be sent.
(3) Enumerate all roles in application.
(4) In case of "Subordinate hierarchy direction", determine all roles that are immediate subordinate to the role-name.
(5) In case of "Senior hierarchy direction", determine all roles that are immediate senior to the role-name.
(6) Enumerate all application users belonging to determined roles.
(7) Send notification for each user.

The runtime synchronization server generates synchronizations related to the application in runtime on a per application programming interface (API) basis across the N clients type rendition of the application based on synchronization frequency specified in the application model. A process statement in the Alfa domain specific language specifies an API. In an embodiment, the process statement specifies an optional clause that provides synchronization related details comprising, for example, synchronization frequency in the Alfa domain specific language. The tri-affinity model driven platform (TAMDP) uses the synchronization related details to generate a code that performs client-side specific synchronization on a per API basis across multiple clients for an end user of the application.

The runtime identity and authorization server of the tri-affinity model driven platform (TAMDP) runtime subsystem authenticates and authorizes users before using the application functionality using role based access control and using a first page login or an inflow login. The runtime identity and authorization server provide role based access to content of the application. In an embodiment, the runtime identity and authorization server allows guest access to some parts of the application. For example, the runtime identity and authorization server provides access to a partial set of screens and functionality of the application based on user roles. The attributes in the application model allow role based access control using filtering, masking, and routing. The runtime identity and authorization server performs role based access control using a "filter for" clause for a user element and process. In an embodiment, the Alfa domain specific language employs a "filter for role (<rolename1>, <rolename2>, ... )" clause for a role based access control on user interface (UI) elements, application programming interfaces (APIs), etc. The role-based access control feature is available to applications that have login enabled. Use of the "filter for role (<rolename1>, <rolename2>, ... )" clause is a blacklist method and results in the generated model containing filter specifications on a corresponding element in both a blacklist method and a whitelist method. The TAMDP runtime subsystem hides the "filtered" element so that the "filtered" element is not accessible or visible to end users belonging to the filtered roles.

The runtime identity and authorization server performs role-based access control using a "mask for" clause for user elements, a process, and a data attribute. In an embodiment, the Alfa domain specific language employs a "mask for role (<rolename1>, <rolename2>, ... )" clause for a role based access control on user interface elements, application programming interfaces, data attributes, etc. This role based access control feature is available to applications that have login enabled. Use of the "mask for role (<rolename1>, <rolename2>, ... )" clause is a blacklist method and results in the generated model containing mask specifications on the corresponding element in both the blacklist method and the whitelist method. The tri-affinity model driven platform (TAMDP) runtime subsystem masks the value in the "masked" element so that the value is crossed out for end users belonging to the masked roles. An algorithm for programming the role based access control into the TAMDP using the Alfa domain specific language is disclosed below:
  (1) Enumerate the roles in the application.
  (2) Enumerate application elements that carry access control information in a whitelist method or a blacklist method.
  (3) Generate a conditional code to evaluate the access control at runtime to perform determination based on a user profile. The determination may result in one of "filter" or "mask" actions on the corresponding application element.

The tri-affinity model driven platform (TAMDP) generates a code to enable a first page login for an application. In an embodiment, the Alfa domain specific language employs a "login=firstPage" clause in an "app" statement. This clause enables the downstream generation of a login page that is presented to the end user when the application is launched. The application can be accessed only with valid authentication credentials. In another embodiment, the Alfa domain specific language employs a "login=inflow" clause in the "app" statement. This clause enables the downstream generation of a login page that is presented to the end user when the end user navigates to the login page from within the application. The end user can access and use those parts of the application that are made available to "guest" role users without valid authentication credentials. Post the end user navigating to a login page and presenting valid authentication credentials, the end user acquires a non-guest role and enjoys role based access control granted access within the remainder of the application.

The tri-affinity model driven platform (TAMDP) generates a code for a named server runtime platform. The Alfa domain specific language is a starting point for application realization. In the Alfa domain specific language, the server-side of the application can be targeted to any of a choice of server runtimes by use of a "backend=<SERVER PLATFORM NAME>" clause. If the server-side is left unspecified, the generated application defaults to the tri-affinity model driven platform (TAMDP) server runtime. The TAMDP generates a code for a named client runtime platform. In the Alfa domain specific language, the client-side of the application can be targeted to one or more of a choice of client runtimes by use of the "frontend=<CLIENT PLATFORM NAME>" clause. Absence of this clause results in generation of a server-only application.

An application manager system of the tri-affinity model driven platform (TAMDP) manages the running application using TAMDP application management tools. Application management tasks comprise, for example, mapping of application roles to user directory roles, creation of end users, updation of end users, deletion of end users, editing of application configuration, etc. The TAMDP runtime subsystem comprises a runtime logger for recording an audit log for actions performed by the administrator and end users of the application. The runtime analyzer and visualizer of the TAMDP runtime subsystem analyses the operation and performance of the application, that is, the cross-platform application using the analysis affinity model. The runtime analyzer and visualizer performs provenance querying using an application chat hot for analyzing the performance of the application. The runtime logger logs various metrics comprising, for example, an application programming interface (API) invocation count, number of visits to the different pages of the cross-platform application, a bounce rate of the cross-platform application, and an exit rate of the cross-platform application. The runtime analyzer and visualizer derives a usage heat map of the cross-platform application and measures application usage, for example, by the authenticated and authorized users, role, time of day, and geographical region using the data logged by the runtime logger.

An algorithm defined in the runtime analyzer and visualizer and executed by at least one processor of the tri-affinity model driven platform (TAMDP) runtime subsystem for visualizing a count of viewing of a particular page in the application is disclosed below.
  (1) Enumerate all pages in application.
  (2) For each page, generate counting logic that will increment each time a page is viewed by an end user.
  (3) At runtime, receive a page view count in storage on server.
  (4) Present a page view count on demand and for a particular page (if any).

An algorithm defined in the runtime analyzer and visualizer and executed by at least one processor of the tri-affinity model driven platform (TAMDP) runtime subsystem for visualizing a heat map of visitations of a particular page in the application is disclosed below.
  (1) Enumerate all pages in application.
  (2) For each page, generate counting logic that will increment each time a page is viewed by an end user.
  (3) At runtime, receive a page view count in storage on server.
  (4) Present a heat map based on a page view count on demand and for a particular page (if any).

An algorithm defined in the runtime analyzer and visualizer and executed by at least one processor of the tri-affinity model driven platform (TAMDP) runtime subsystem for visualizing a bounce rate in the application is disclosed below.
  (1) Enumerate all pages in the application.
  (2) For each page, generate bounce rate logic that will increment each time the application is exited from a page with the page being first in the session by an end user.
  (3) At runtime, receive a bounce rate in storage on server.
  (4) Present a bounce rate on demand and for a particular page (if any).

An algorithm defined in the runtime analyzer and visualizer and executed by at least one processor of the tri-affinity model driven platform (TAMDP) runtime subsystem for visualizing a page exit rate in the application is disclosed below.
  (1) Enumerate all pages in application.
  (2) For each page, generate page exit rate logic that will increment each time the application is exited from a page with the page not being first in the session by an end user.
  (3) At runtime, receive a page exit rate in storage on server.
  (4) Present a page exit rate on demand and for particular page (if any).

An algorithm defined in the runtime analyzer and visualizer and executed by at least one processor of the tri-affinity model driven platform (TAMDP) runtime subsystem for visualizing application usage by user is disclosed below.
  (1) Enumerate all pages in the application.
  (2) For each page, generate "clicked", "viewed", and "opened" counter logic that will increment each time an end user performs a corresponding action.

(3) At runtime, receive data in storage on server.

(4) Present application usage data on demand and for a particular page (if any).

An algorithm defined in the runtime analyzer and visualizer and executed by at least one processor of the tri-affinity model driven platform (TAMDP) runtime subsystem for visualizing application usage by role is disclosed below.

(1) Enumerate all pages in the application.

(2) For each page, generate "clicked", "viewed", and "opened" counter logic that will increment each time an end user in a particular role performs corresponding action.

(3) At runtime, receive data in storage on server.

(4) Present location usage data on demand and for a particular page (if any).

An algorithm defined in the runtime analyzer and visualizer and executed by at least one processor of the tri-affinity model driven platform (TAMDP) runtime subsystem for visualizing application usage by time of day is disclosed below.

(1) Enumerate all pages in the application.

(2) For each page, generate "clicked", "viewed", and "opened" counter logic that will increment each time an end user performs a corresponding action retaining the time stamp when the action was performed.

(3) At runtime, receive data in storage on server.

(4) Present application usage by time-of-day data on demand and for a particular page (if any).

An algorithm defined in the runtime analyzer and visualizer and executed by at least one processor of the tri-affinity model driven platform (TAMDP) runtime subsystem for visualizing application usage by geographical region is disclosed below.

(1) Enumerate all pages in application.

(2) For each page, generate "clicked", "viewed", and "opened" counter logic that will increment each time an end user performs a corresponding action retaining geo-location coordinates when the action was performed.

(3) At runtime, receive data in storage on server.

(4) Present application usage by geographical region data on demand and for a particular page (if any).

An algorithm defined in the runtime analyzer and visualizer and executed by at least one processor of the tri-affinity model driven platform (TAMDP) runtime subsystem for visualizing performance of an application is disclose below.

(1) Enumerate all pages in application.

(2) For each page, generate "time taken to load", "time taken to first view render", "time taken to show entire page" logic that will record each time an end user navigates to a page.

(3) At runtime, receive data in storage on server.

(4) Present application performance data on demand and for a particular page (if any).

The runtime analyzer and visualizer acts on the collected application usage data and the analysis affinity model to provide various types of analyses. The machine learning based recommendation engine of the tri-affinity model driven platform (TAMDP) runtime subsystem acts on the collected application usage data and suggests enhancements on the application using a machine learning algorithm. The TAMDP enhances the application using the analysis affinity model to generate machine learning based recommendations to regenerate the application model, that is, either the human affinity model or the machine affinity model. In an embodiment, such revised human affinity models or machine affinity models are then used to regenerate the application. Enhancements recommended and effected by the recommendation engine involve a rearranging navigation between user interfaces (UIs), a change of UI elements to another UI element, etc.

The tri-affinity model driven platform (TAMDP) uses model driven engineering methods to develop and run cross-platform applications with improved application development time, effort, skill level, and costs. The TAMDP reduces skill level required to build the applications by the creation and implementation of the human affinity model using the Alfa domain specific language which is an expressive, closer-to-natural-language modeling language. The TAMDP incorporates best practices in coding by providing code generation using the machine affinity model. The TAMDP churns out more applications with a small team by lowering the skill requirements for building cross-platform applications, such that application developers need not be skilled in platform specific technologies to build applications on them. The TAMDP helps application developers and business information technology (IT) cope with the increased demand for applications by enabling fast and low cost development of applications. The TAMDP also decreases maintenance due to rapid evolution in the underlying native platforms, by abstracting the application knowledge into the models of the TAMDP, out of the platform specific details, thus making the applications easy to migrate on new releases of the underlying native platforms. The TAMDP also has a substantially increased ability to analyze and incorporate design and development feedback during the design and development process, by the use of the human affinity model and the analysis affinity model, both readable and understandable by business personnel and/or domain personnel. The TAMDP exhibits a substantially increased ability to analyze the application during runtime, by the use of the analysis affinity model.

Figure 2:
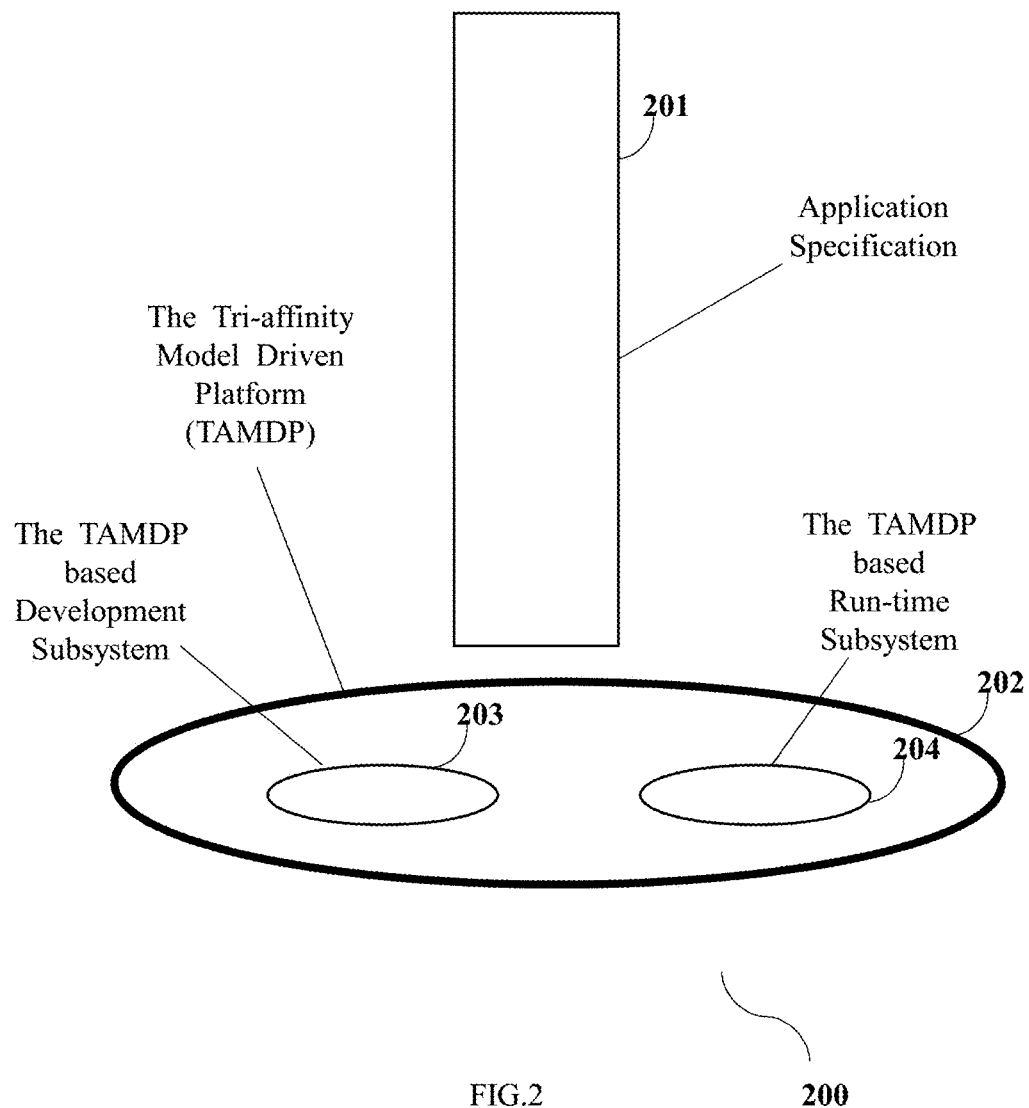
FIG. 2 exemplarily illustrates a schematic diagram of the tri-affinity model driven platform comprising a tri-affinity model driven platform development subsystem and a tri-affinity model driven platform runtime subsystem.

FIG. 2 exemplarily illustrates a schematic diagram of the tri-affinity model driven platform (TAMDP) 202 comprising the TAMDP development subsystem 203 and the TAMDP runtime subsystem 204. The TAMDP development subsystem 203 comprises the compiler, the model-to-model (M2M) transformer, the model-to-text (M2T) transformer, and the development time analyzer and visualizer. The TAMDP runtime subsystem 204 comprises the runtime analyser and visualizer and the runtime logger for deploying and running the cross-platform application. As exemplarily illustrated in FIG. 2, an application specification 201 compliant to the predefined canonical meta-models is provided as an input to the TAMDP development subsystem 203 for developing the cross-platform application and to the TAMDP runtime subsystem 204 for executing the cross platform application.

Figure 3:
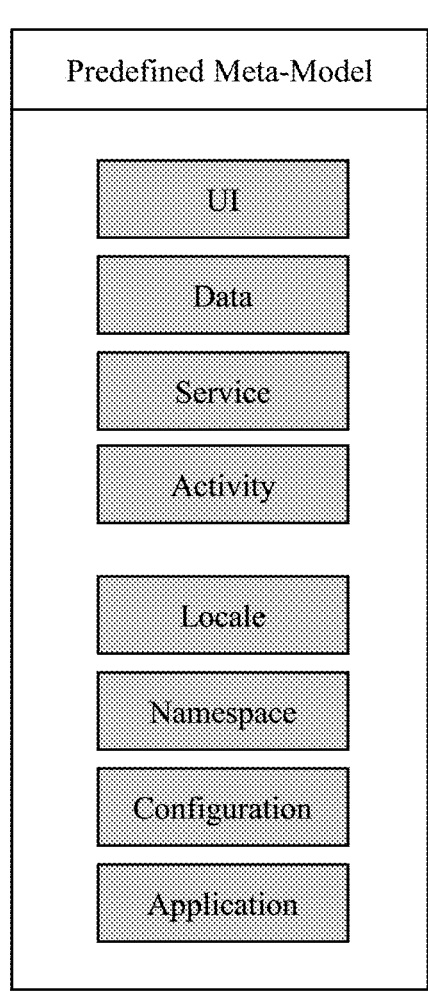
FIG. 3 exemplarily illustrates a schematic diagram of a predefined canonical meta-model used by the tri-affinity model driven platform for specifying an application.

FIG. 3 exemplarily illustrates a schematic diagram of a predefined metamodel 301 used by the tri-affinity model driven platform (TAMDP) 202 exemplarily illustrated in FIG. 2, for specifying an application. Descriptive attributes of the eight meta-models 301 of the TAMDP 202 comprising, for example, the application (app) meta-model, the namespace meta-model, the configuration (config) meta-model, the locale meta-model, the activity metamodel, the service meta-model, the data meta-model, and the user interface metamodel are input to the TAMDP 202 to generate the human affinity model or the machine affinity model for different applications. The app meta-model provides descriptive attributes to hold information that pertains to the application as a whole. The information pertains to administrative and governance aspects of the application. Examples of the descriptive attributes of an app meta-model are disclosed below.

```
owner="com.app4servicecenter"
description="App for running a service center"
login="Yes"
```

If the login attribute set to "Yes", users require credentials to access any interface, that is, a human interface or a machine interface of the application. If the login attribute is set to "No", then any user, that is, a guest is allowed access to any interface, that is, a human interface or a machine interface of the application.

deviceCapabilitiesDetection="Yes"

If the deviceCapabilitiesDetection attribute is set to "Yes", the client sides of the application provide data about the technical capabilities of the device hosting the client sides, for example, "screen resolution", "screen density", "camera availability", and "GPS availability".

```
publications clientType="Android"
publications clientType="iOS"
publications clientType="SMS"
publications clientType="IVRS"
```

The publications clientType attribute enumerates the target platforms for which client sides and client-side specific server sides of the application are to be available.

```
roles name="FrontOfficeExecutive"
roles name="Admin"
```

The roles name attribute enumerates the roles that human users have within the application. The roles allow users access to certain parts of the application.

The namespace meta-model provides descriptive attributes to hold information about identification, for example, identifiers, partial identifiers, version, etc., of constituent elements within application models and/or contents of application models. Examples of descriptive attributes of the namespace metamodel are disclosed below.

applicationNamespaceBase=www.app4servicecenter.com

A set of application models are specific to a version. An application may have multiple versions. The applicationNamespaceBase attribute holds an identifier for the set of application model sets across multiple versions. Each and every constituent element is within the application models is uniquely identifiable. The uniform resource identifier (URI) is used as an identifier for each constituent element. The complete identifier for any such constituent element is formed by concatenation of multiple segments or multiple partial identifiers, where applicationNamespaceBase is a prefix common to all, which is followed by an application namespace version and by a model type. Each model occupies its own namespace. The element name is the suffix.

namespaceVersion major="1" minor="0" increment="0"

The namespaceVersion major attribute holds the version number of the application (namespace).

The config meta-model provides descriptive attributes to hold information about parameters that have characteristics that need to be set according to the external environment, characteristics that are used by the application during operation, characteristics that must be changeable by an application administrator or any user during the life of the operation of the application. Examples of descriptive attributes of the config meta-model are disclosed below.

```
configurationParameter name="allow_enduser_opt_in"
  description="Configuration item allow_enduser_opt_in"
type="String"
  required="Yes" value="No"
configurationParameter name="database_name" description="Name of the database" type="String" required="Yes" value="apps_app4sc"
```

The configurationParameter attribute holds a name, description, and other information about a configuration item.

The locale meta-model provides descriptive attributes to hold information about parameters that are dependent on geographic region aspects, for example, language, colour, currency, images, etc. Examples of descriptive attributes of the locale meta-model are disclosed below.

```
localizationSet languageCode2Letter="en" default="Yes"
localizationSet languageCode2Letter="fr"
```

The localizationSet attribute holds the locale identifier.

```
entries name="text_signin" value="Sign in"
entries name="text_signin" value="Se connecter"
```

The entries attribute holds a name and a value entry for a locale.

The activity meta-model provides descriptive attributes to hold information about access control based on role based access control (RBAC) and/or attribute-based access control (ABAC) for entry points. An activity is an ordered set of steps, for example, screens and application programming interfaces (APIs), that are performed to fulfill or partially fulfill a particular business process. The "entry point" to an activity is the first step, for example, a screen or an API in the activity. Examples of descriptive attributes of the activity metamodel are disclosed below.

```
Activity name="ListAllBrands"
  roleName=Customer
  roleName=FrontOfficeExecutive
```

The roleName attribute holds role names that have been granted or denied access to a constituent element within application models. An example of an activity comprising multiple steps, for example, screen steps or application programming interface (API) steps is disclosed below.

```
Activity name="LandingPage"
  roleName=Customer
  roleName=FrontOfficeExecutive
Activity name="ListAllBrandsAPI"
  roleName=Customer
  roleName=FrontOfficeExecutive
Activity name="ListAllBrandsModels"
  roleName=Customer
  roleName=FrontOfficeExecutive
Activity name="ListAllBrandsModelProblems"
  roleName=Customer
  roleName=FrontOfficeExecutive
Activity name="SubmitRepairOrderFormAPI"
```

```
        roleName=Customer
        roleName=FrontOfficeExecutive
```

The above activities are performed in a given order.

The service meta-model provides descriptive attributes to hold information about all machine interfaces provided by the server side of the application for integrating the client side of the application as well as other external systems. Herein, "machine" specifically refers to one or more non-living users, that is, one or more non-human users of the application. Examples of descriptive attributes of the service meta-model are disclosed below.

```
service name="Brands"
    parameter name="varCategoryKey" description="Path parameter
    'varCategoryKey'" typeOrEntityName="String"
    result idempotent="Yes" safe="Yes" name="BrandsResult"
    entityName="[BrandsPickerObject]"
    executionInfo type="REST" name="BrandsApi"
    path="/category/{varCategoryKey}/brands/picker"
    producesMediaTypes=application/json
    logic name="Brands"
```

The above examples specify a sample machine interface or an application programming interface (API). The logic name attribute holds an identifier of the corresponding business logic provided by an application developer.

The data meta-model provides descriptive attributes to hold information about data structures that provide a transmission format specification for data, that is, schema, structure, and data type information for data in-flight or data at-rest, that flows across application clients and the application server or across the application server and an external system. Examples of descriptive attributes of the data meta-model are disclosed below.

```
dataModel name="fixkart_website" supportXMLSerialization="Yes"
persistent="Yes" onServer="Yes" onClient="Yes"
    A dataModel can contain one or more entities.
    entity name="CategoryMaster" nameInPersistentStore="mst_ctg"
        An entity can contain multiple "attribute"-s.
        attribute    name="Category"    nameInPersistentStore="ctg"
dataType="String"
        length="50"
        attribute                       name="CategoryDescription"
ameInPersistentStore="ctg_des"
            dataType="String" length="250"
```

The user interface (UI) meta-model provides descriptive attributes to hold information about all UI related aspects of the application, wherein "user" specifically refers to one or more living users, that is, one or more human users of the application. UIs comprising, for example, a text user interface (TUI), a graphical user interface (GUI), an interface of an interactive voice response system (IVRS), a voice user interface (VUI), a short message service (SMS), and unstructured supplementary structured data (USSD) are specifiable using the UI meta-model. Examples of descriptive attributes of the UI meta-model are disclosed below.

```
widgets    type="ui:ScrollView"    name="SV_Content"
matchParentWidth="true"
matchParentHeight="true" singleAxis="true" horizontal="false"
    widgets  type="ui:Layout"   name="LAY_InitiateRepair_Repair"
gravity="right"
```

```
        wrapContentWidth="true" wrapContentHeight="true" flex="true"
        widgets type="ui:Picker" name="P_Category"
```

The above sample code is an example of a user interface (UI) element layout based on containment, wherein UI elements that are nested in other UI elements are referred to as "child" elements of the "parent" elements. Such organization of the UI elements enables layouting of a display area by dividing the display area into a substantially smaller nested rectangular area. In addition to this, properties may be set per UI element to specify the look and positioning of the UI elements.

```
panel
metadata name="attributes"
    metadataAttribute name="android_hide_soft_navigation_bar" value="true"
```

The "panel" attribute indicates start of a specification of a user interface (UI) that occupies the entire display area. The "metadata" attribute holds information about non-visual and non-behavioral aspects of the UI. The "metadataAttribute" attribute holds a single metadata item. In this example, the "metadataAttribute" attribute holds guidance specific to a target platform, for example, Android for a downstream UI, that is, the target application client platform code generation.

template ident="FragmentCreateInvoiceForm"

The "template" attribute indicates start of the specification of a user interface (UI) that occupies a partial display area. In this example, the template is named "FragmentCreateInvoiceForm".

```
widget type="ui:Button" name="B_Repair" wrapContentWidth="true"
    wrapContentHeight="true" textLocaleRef=label_repair"
    backgroundColor>255</backgroundColor
    materializationAttributes>       role      (FrontOfficeExecutive
    </materializationAttributes
    materializationAttributes>filterrole(QA) <materializationAttributes
    materialization Attributes=variant=2
```

The "widget" attribute indicates a user interface (UI) element in the display area. This UI element specification is target platform agnostic. The "type of the "widget" is suggestive of a commonly known UI element. The "textLocaleRef" attribute holds a reference to an entry in the locale meta-model. The entry in the locale meta-model provides the text that is to be shown in the UI element allowing for localization of the UI element.

In an embodiment, various properties about the widget, for example "backgroundColor", "margin", and "text alignment" are specified along with the "widget". The "materializationAttributes" attribute holds data that does not impact the visual rendition of the UI element. In this example, "role(FrontOfficeExecutive)" specifies that access to this UI element would be granted to the role "FrontOfficeExecutive" and "filterrole(QA)" specifies that access to this UI element would be denied to the role "QA".

User interface (UI) elements can have any number of renditions, with each rendition being a named variant. The application developer can select a variant from the available variants. In this example, the materialization attribute "variant=2" specifies that all target application client platforms must use the UI element rendition identified as variant 2. In an embodiment, the application developer can select a variant per target application client platform.

```
widget type="ui:Picker" name="P_Brand" wrapContentWidth="true"
wrapContentHeight="true" model="PickerDTO" dataRef="Brands"
```

The "model" attribute holds the name of an entity in a data model which provides the structure for the data presented in the user interface (UI) element. The "dataRef" attribute holds the name of an entry in the service meta-model. The application programming interface (API) mapped to this entry in the service metamodel is invoked to return the data at runtime to populate the UI element.

```
widget type="ui:List" name="LST1" fragmentRef="AssetTypeItem"
model="AssetTypeItemDTO" dataRef="ListAllAssetTypesService"
materializationAttributes>adapt(visibility)=orientation=portrait?true:false
</materializationAttributes
```

The "fragmentRef" attribute holds the name of a template which contains the layout to be used for displaying one element of the many that are shown within the user interface (UI) element. In this example, the materialization attribute "adapt(visibility)=orientation=portrait?true:false" specifies that the UI element must be visible in a portrait orientation only.

```
widget type="ui:Springboard" name="SB1"
widget type="ui:MenuOption" name="AddModelMaster"
labelLocaleRef="label_addmodelmaster" iconRef="icon_addmodelmaster"
widget type="ui:MenuOption" name="ViewModelMaster"
labelLocaleRef=label_viewmodelmaster"
iconRef="iconview_modelmaster"
```

This is an example of a complex user interface (UI) element named "Springboard". Complex UI elements are composed of other UI elements with inbuilt look and positioning of contained UI elements.

```
widget type="ui:DataDeterminedMultiLayout" name="ML_AllCustomers"
matchParentWidth="true" matchParentHeight="true"
determinantAttribute="zebra" model="CustomerDTO"
dataRef="ListAllCustomersService"
materializationAttributes>filtered </materializationAttributes
determinantTofragmentRef> even:CustomersItemEven
</determinantTofragmentRef
determinantTofragmentRef=odd:CustomersItemOdd
```

In the above example, a complex user interface (UI) element is shown in which a contained layout is determined based on data made available at runtime. In this example, a list appearance is enhanced with different zebra striped layouting for the odd and even rows of list items.

```
widget    type="ui:Form"    name="FRM1_CreateInvoice"
matchParentWidth="true"
matchParentHeight="true" titleLocaleRef="titleCreateInvoice"
fragmentRef="FragmentCreateInvoiceForm"model="InvoiceDTO"
submitRef="SubmitInvoiceService"
materializationAttributes=drafts
```

Disclosed above is an example of the "Form" user interface (UI) element which is used for data collection. A "Form" contains UI elements, for example, edit boxes, check boxes, radio buttons, drop down menus or pickers, that support input of data by the end user. The "submitRef" attribute holds the name of an entry in the service meta-model that maps to the application programming interface (API) on the application server side that receives the form submission.

In the above example, the "drafts" materialization attribute indicates that the data being entered in the form is to be saved intermittently as a draft, that is, a yet to be completed form, in storage that is local to a host application client device.

```
widget type="ui:CaptureImage" name=I_Images" matchParentWidth=true"
hintLocaleRef="hint_Images" boundTo="ImageFileNames"
```

Some user interface (UI) elements are used to surface host device capabilities. In the above example, the UI element "CaptureImage" is used, which integrates a host device camera for taking a picture. The "boundTo" attribute names the property within the containing form's model. Data binding between interactive UI elements and the model is established using the "boundTo" attribute.

```
widget type="ui:Map" name="M1" matchParentWidth="true"
matchParentHeight="true" model="MapInfoDTO"
dataRef="CustornerLocationsMapService"
```

Some user interface (UI) elements are used to integrate information services provided by third party providers. In this example, the "Map" UI element is used which integrates with third party web mapping service providers.

```
widgets type="ui:Label" name="L_notificationTitle" textStyleBold="true"
boundTo="notificationTitle"
badge=10%off|topleft|triangle|0xFF0000AA
```

Badging refers to overlaying some content at a chosen position on a user interface (UI) element. In this example, the "badge" attribute holds data specifying the static content of the badge as well as its position on the UI element, for example, the Label "L_notificationTitle" and color. In an embodiment, the value for the "badge" attribute is dynamic, that is, provided by a network service application programming interface (API).

Behaviors that are to be carried out upon occurrence of an event on particular user interface (UI) elements are disclosed below.

```
condition type="ui:Event" eventType="Select" partName="LST1"
eventChild type="ui:Variable" name="varAssetType" dataType="String"
variableChild type="ui:VariableProperty" name="assetType"
containerType="List" container="LST1" containeeName="selected"
```

In the above example, "Select" that results in a selection of the user interface (UI) element itself or a selection of an item within a UI element, is the event. The occurrence of the event on the List UI element named "LST1" acts as a trigger for the associated behaviour to be carried out. The associated behaviour in this example is the creation or assignment of a variable named "varAssetType". The value to be assigned is taken from the selected item that is selected by the end user by tapping or clicking on the item of the List UI element named "LST1". This value is extracted from the "assetType" property of the model associated with the List UI element.

```
eventChild type="Call" componentId="Segue" methodId="Present"
mixedContentText=EditAssetTypeAccessoryMaster
mixedContentText=varAssetType
mixedContentText=varAssetTypeKey
```

In the above section subsequent to the creation or assignment of a variable behaviour, the next behaviour carried out is navigation or segue by a method of presenting a user interface (UI) named "EditAssetTypeAccessoryMaster" and additionally passing the value of a variable named "varAssetTypeKey" to the next UI.

```
condition type="ui:Event" type="Select" partName="Submit"
eventChild type=Call" componentId="Form" methodId="post"
mixedContentText=FRM1_CreateInvoice
```

In the above example, the occurrence of the "Select" event on the button user interface (UI) element named "Submit" acts as a trigger for the associated behaviour to be carried out. The associated behaviour in this example is the submission of a form indicated by componentId "Form" and methodId "post" named "FRM1_CreateInvoice". One or more values to be submitted are taken from the UI elements related to data capture that are defined in the associated fragment referred in the "fragment ref" clause of the UI element. The values to be submitted are packaged as per the data structure dictated by the model associated with the form mentioned in the "model" clause of the form UI element. The submission is performed to the application programming interface (API) over a network mentioned in the "submit" clause of the form UI element.

```
condition type="ui:Event" type="Select" partName="Submit"
eventChild type="Call" componentId="Bluetooth" methodId="Print"
mixedContentText=PrintInvoiceBySoService
mixedContentText="template_invoice.txt"
```

In the above example, the occurrence of the "Select" event on the button user interface (UI) element named "Submit" acts as a trigger for the associated behavior to be carried out. The associated behavior in the above example is printing over a Bluetooth® communication protocol of Bluetooth Sig, Inc., on a paired Bluetooth® printing device. The content to be printed is provided as a combination of a template file named "template_invoice.txt" and an application programming interface (API) named "PrintInvoiceBySoService". The API responds with data that is selectively substituted into the template before printing.

```
condition type="ui:Event" type="Select" partName="Submit"
eventChild type="Variable" name="u" type="String"
variableChild type="ui:VariableProperty" name="username"
containerType="model"
eventChild type="Variable" name="p" type="String"
variableChild type="ui:VariableProperty" name="password"
containerType=model"
eventChild type="Call" componentId="Session" methodId="signin"
mixedContentText=u
mixedContentText=p
```

In the above example, the occurrence of the "Select" event on the button user interface (UI) element named "Submit" acts as a trigger for the associated behaviour to be carried out. The associated behaviour in the above example is the signing in signified by the componentId "Session" and methodId "signin" for authentication of an end user using a username and a password entered by the end user.

Figure 4:
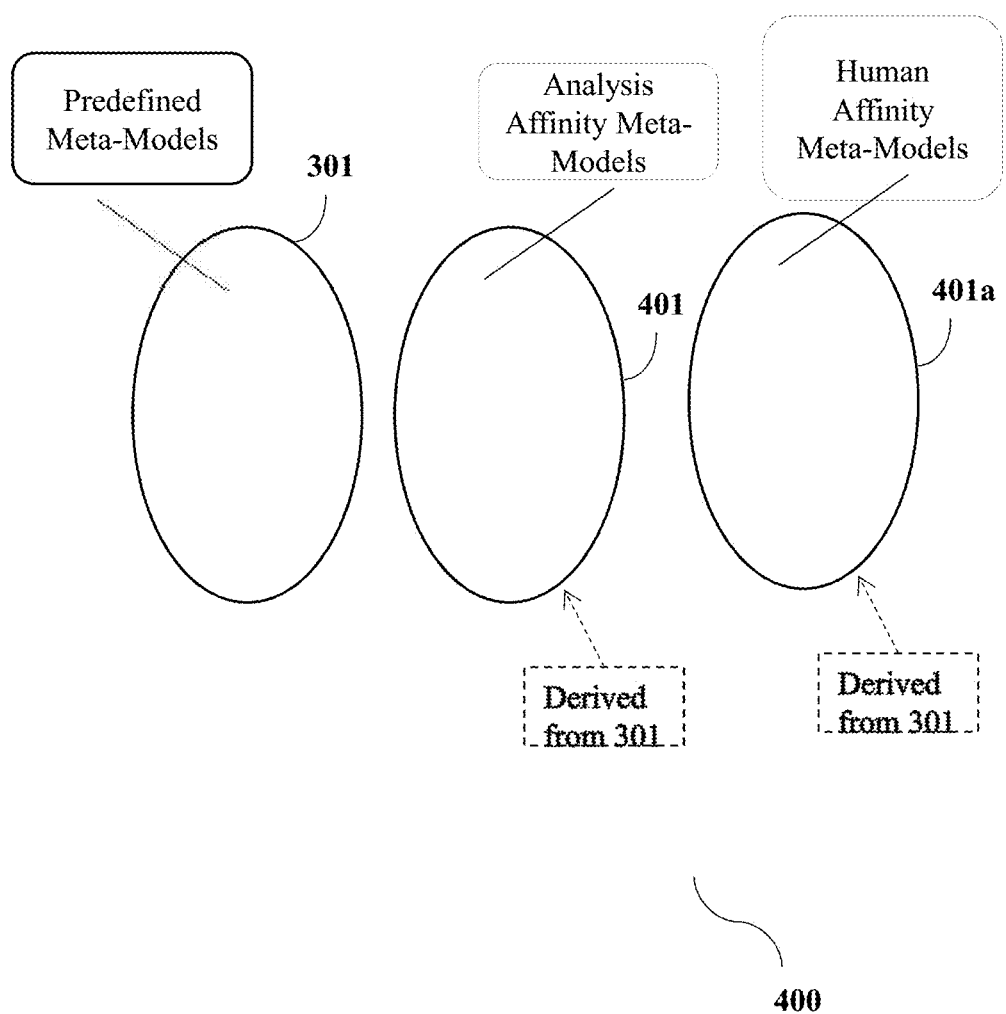
FIG. 4 exemplarily illustrates a schematic diagram showing derivation of human affinity meta-models and analysis affinity meta-models from predefined canonical meta-models used by the tri-affinity model driven platform for analyzing an application.

FIG. 4 exemplarily illustrates a schematic diagram showing derivation of non-canonical meta-models for analysis affinity 401 for analyzing an application, and non-canonical meta-models for human affinity 401a for authoring an application, from predefined canonical meta-models 301 used by the tri-affinity model driven platform (TAMDP) 202 exemplarily illustrated in FIG. 2. The analysis meta-models 401 are one-time hand authored to correspond to the predefined canonical meta-models 301. The human affinity model has a transformation from and to a machine affinity model. A human affinity model has an optional translation to another human affinity model. A domain specific modeling language, such as Alfa, allows human application developers to author the human affinity model for the application.

Figure 5:
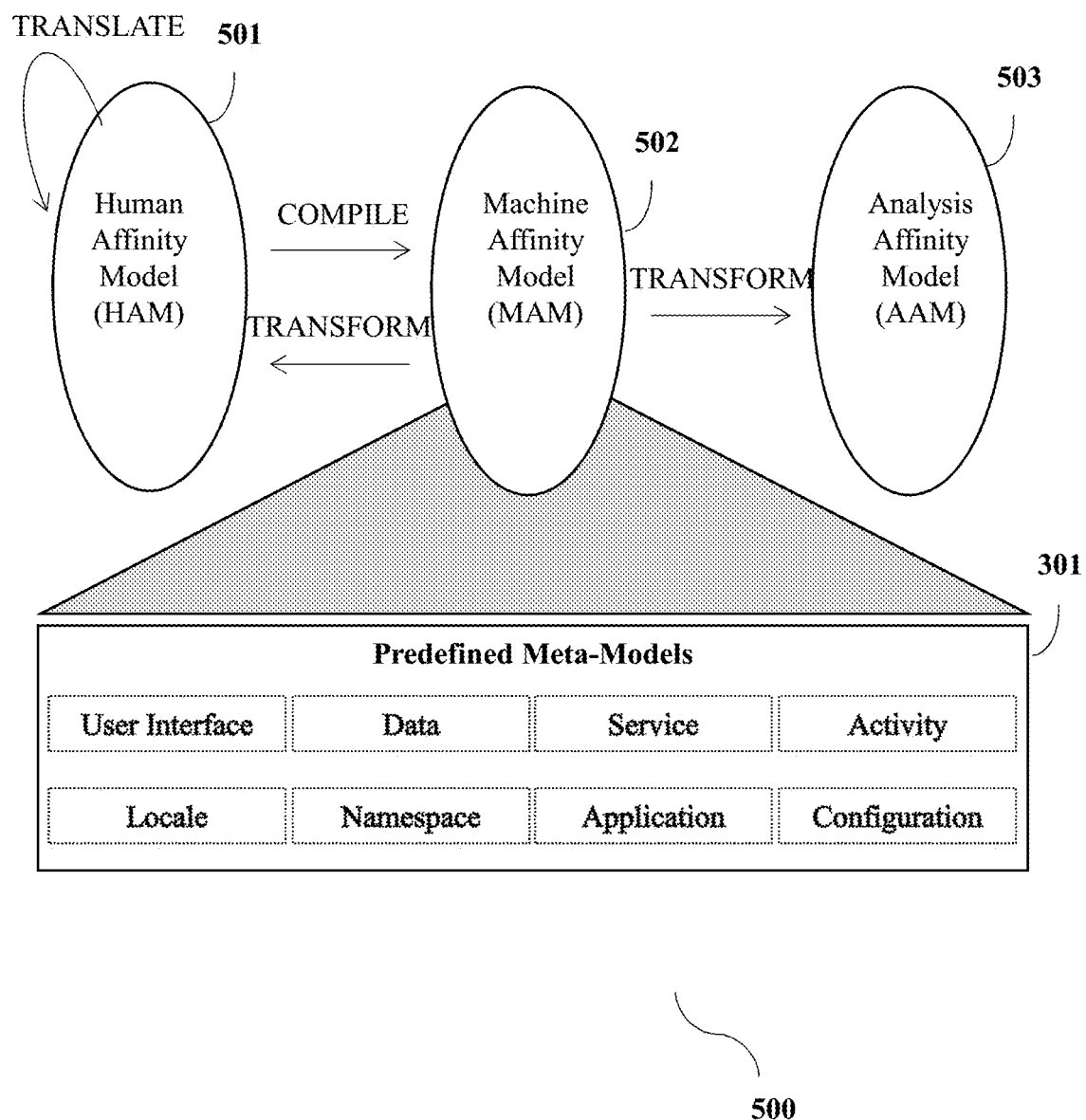
FIG. 5 exemplarily illustrates a schematic diagram showing interactions between the predefined meta-models, the analysis affinity and human affinity meta-models, and tri affinity models in realizing an application using the tri-affinity model driven platform.

FIG. 5 exemplarily illustrates a schematic diagram showing interactions between the predefined canonical meta-models 301, the analysis meta-models 401, the human affinity meta model 401a, and tri-affinity models 501, 502, and 503 in realizing an application using the tri-affinity model driven platform (TAMDP) 202 exemplarily illustrated in FIG. 2. The input values of the descriptive attributes of the predefined canonical meta-models 301 of the TAMDP 202 are received in a human affinity mode or a machine affinity mode. An instance of an application created in the human affinity mode realizes a human affinity model 501 of the application and an instance of an application created in the machine affinity mode realizes a machine affinity model 502 of the application. As disclosed in the detailed description of FIGS. 1A-1B, for every human affinity model 501 and machine affinity model 502, an analysis affinity model 503 is created via, a transformation process that is compliant with an analysis meta-model 401. The machine affinity model 502 is compliant with the predefined canonical meta-models 301. The human affinity model of an application is optionally translated to another human affinity model of the same application using a translation process, such as translation of a human affinity model authored by a developer using a domain specific language, such as Alfa, in a specific vernacular spoken language, such as English, to another human affinity model of the same application using a domain specific language, such as Alfa, in another vernacular spoken language, such as German, using a translation process.

Figure 6:
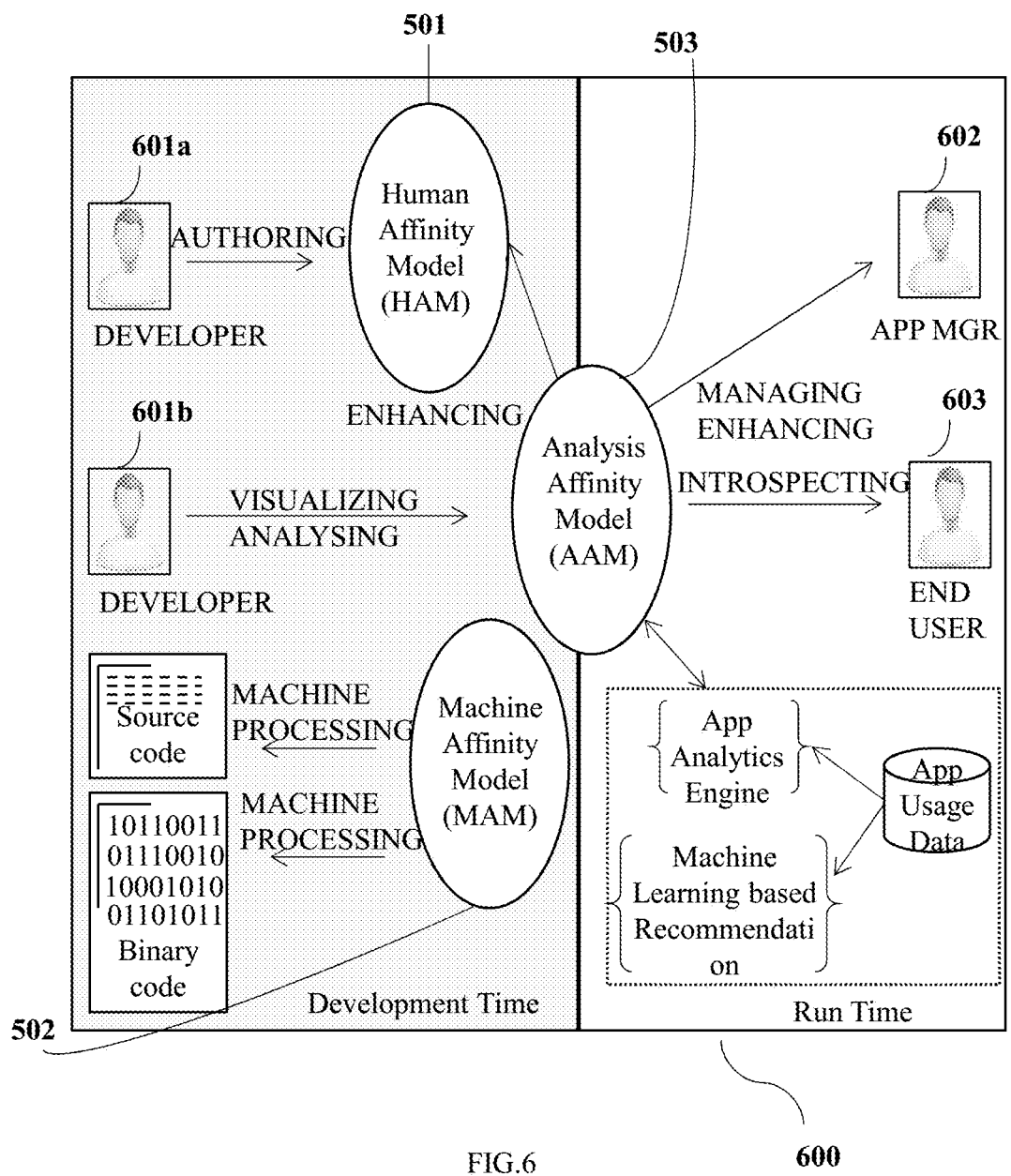
FIG. 6 exemplarily illustrates a schematic diagram showing interactions between developers, administrators, and end users, and the tri-affinity models during development and runtime of an application.

FIG. 6 exemplarily illustrates a schematic diagram showing interactions between developers 601a and 601b, administrators or application managers 602, and end users 603, and the tri-affinity models 501, 502, and 503 during development and runtime of an application. A developer 601a or 601b hand authors the human affinity model 501 of an application and analyses the application during development time using its analysis affinity model 503. The end user 603 introspects the application using the analysis affinity model 503. An administrator or an application manager 602 analyses the operations of the application during runtime using the analysis affinity model 503 and the data recorded during operations. The end users 603 do not interact with the machine affinity model 502. The machine affinity model 502 is used to generate the source code and the binary code.

Figure 7:
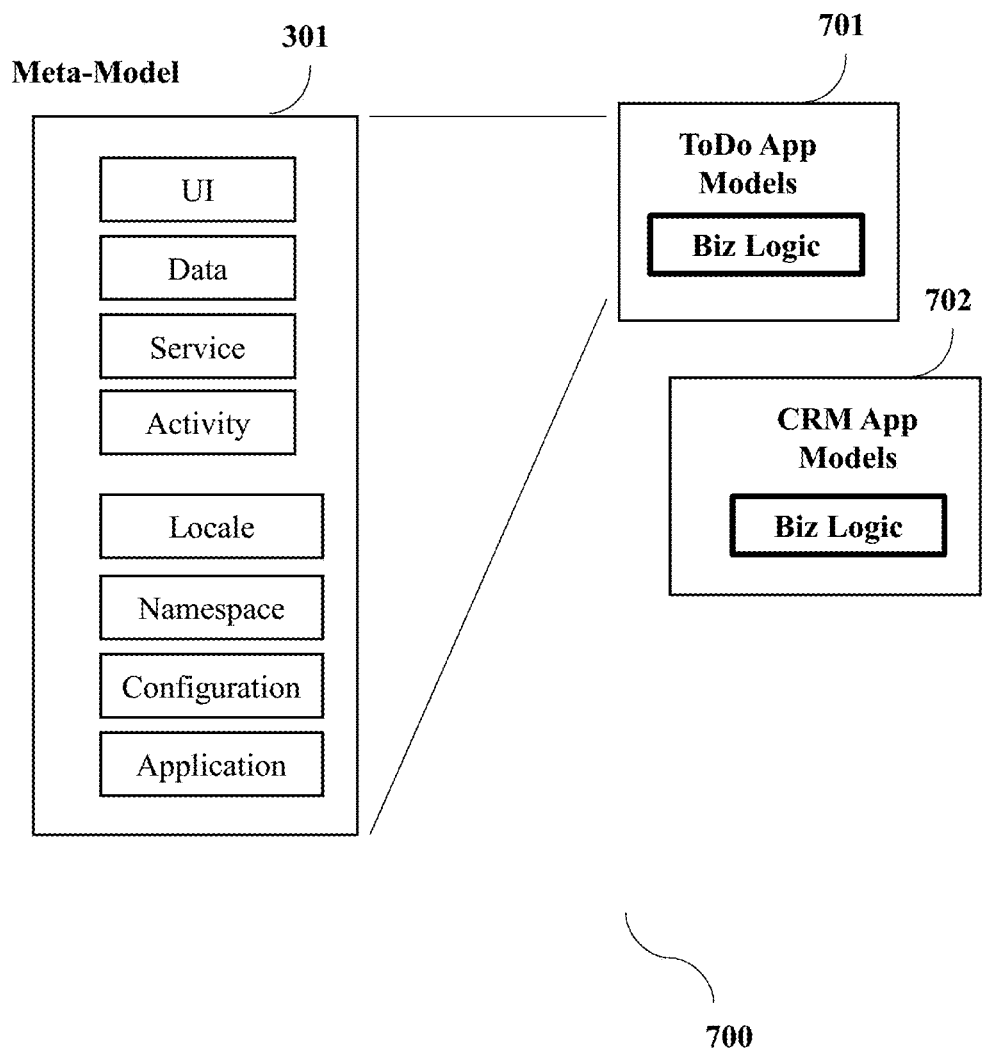
FIG. 7 exemplarily illustrates a schematic diagram showing a singular instance of the predefined meta-models and models per application in the tri-affinity model driven platform.

FIG. 7 exemplarily illustrates a schematic diagram showing a singular instance of the predefined canonical meta-models 301 and models 701 or 702 per application in the tri-affinity model driven platform (TAMDP) 202 exemplarily illustrated in FIG. 2. With a set of input values for the descriptive attributes of the predefined canonical meta-models 301, a developer of the application using the TAMDP 202 realizes an application model 701 specific to an application (app), for example, a ToDo app. Similarly, with another set of input values for the descriptive attributes of the predefined canonical meta-models 301, the developer realizes an application model 702 specific to another application, for example, a CRM app.

Figure 8:
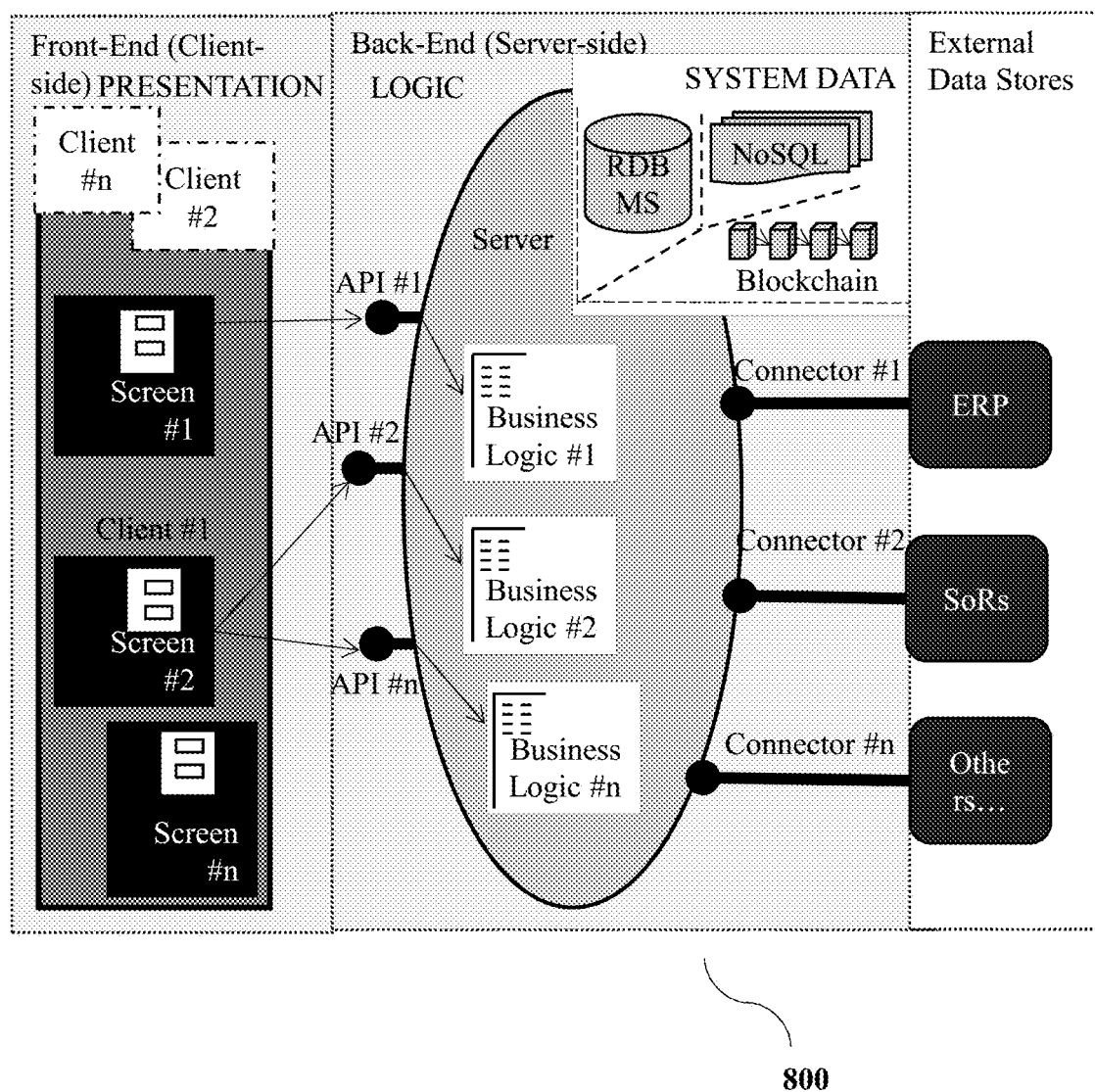
FIG. 8 exemplarily illustrates a schematic diagram of an application realized using a tri affinity model driven method and deployed in the tri-affinity model driven platform.

FIG. 8 exemplarily illustrates a schematic diagram of an application realized using a tri-affinity model driven method and deployed in the tri-affinity model driven platform (TAMDP) 202 exemplarily illustrated in FIG. 2. The separation between a frontend of the application and a backend of the application is exemplarily illustrated in FIG. 8. The application frontend, that is, a client-side rendition of the application, comprises a user interface. The business logic is implemented in the application backend, that is, in the server side rendition of the application. The application frontend runs on a targeted client platform. The application backend runs on a targeted server platform. The application data resides in external data stores comprising, for example, a relational database management system (RDBMS), a NoSQL data store, a blockchain, etc. In an embodiment, the application backend connects to external system of record (Sons), external web services, etc. Connectors are used to integrate with external entities.

Figure 9A:
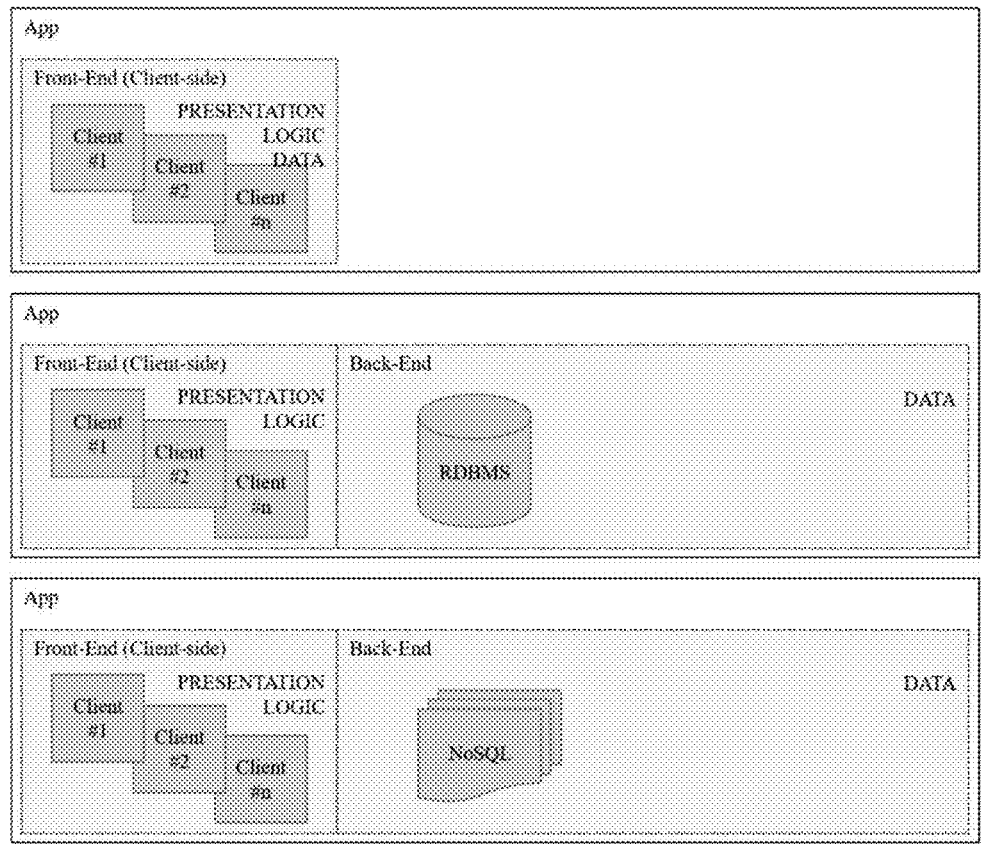
FIGS. 9A-9C exemplarily illustrate schematic diagrams showing applications and topologies of different types that can be realized using the tri-affinity model driven method.
Figure 9B:
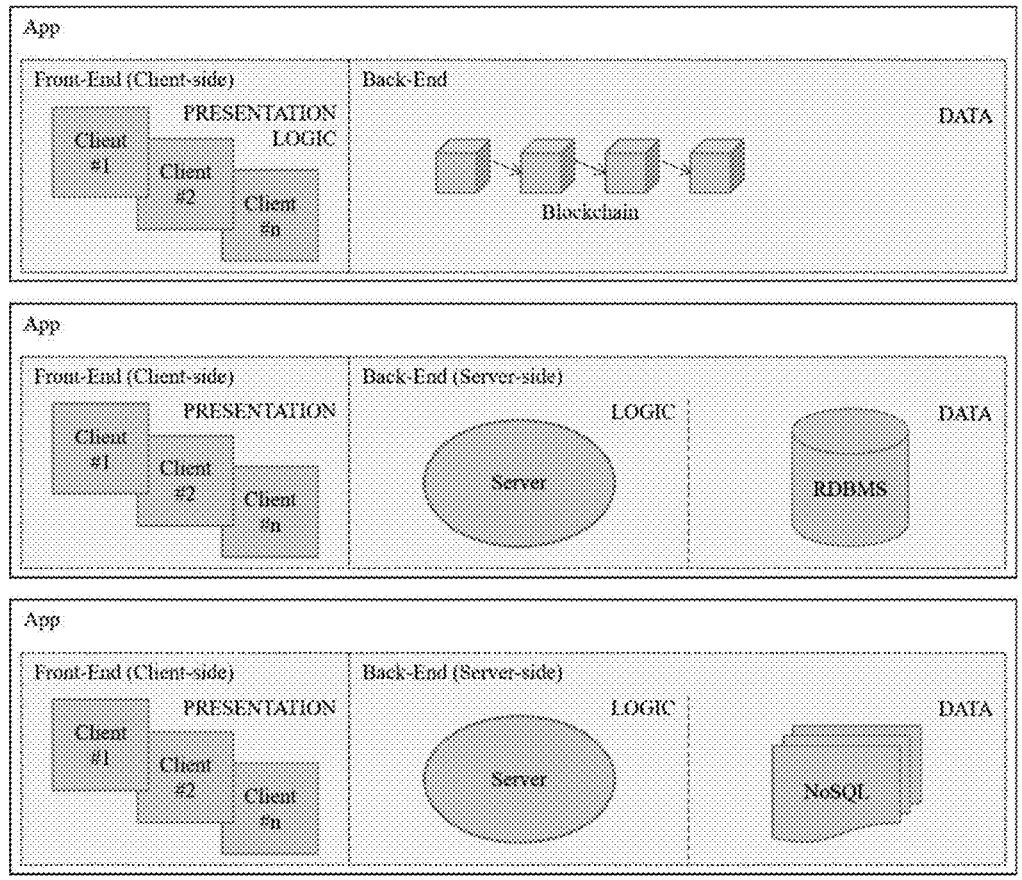
Figure 9C:
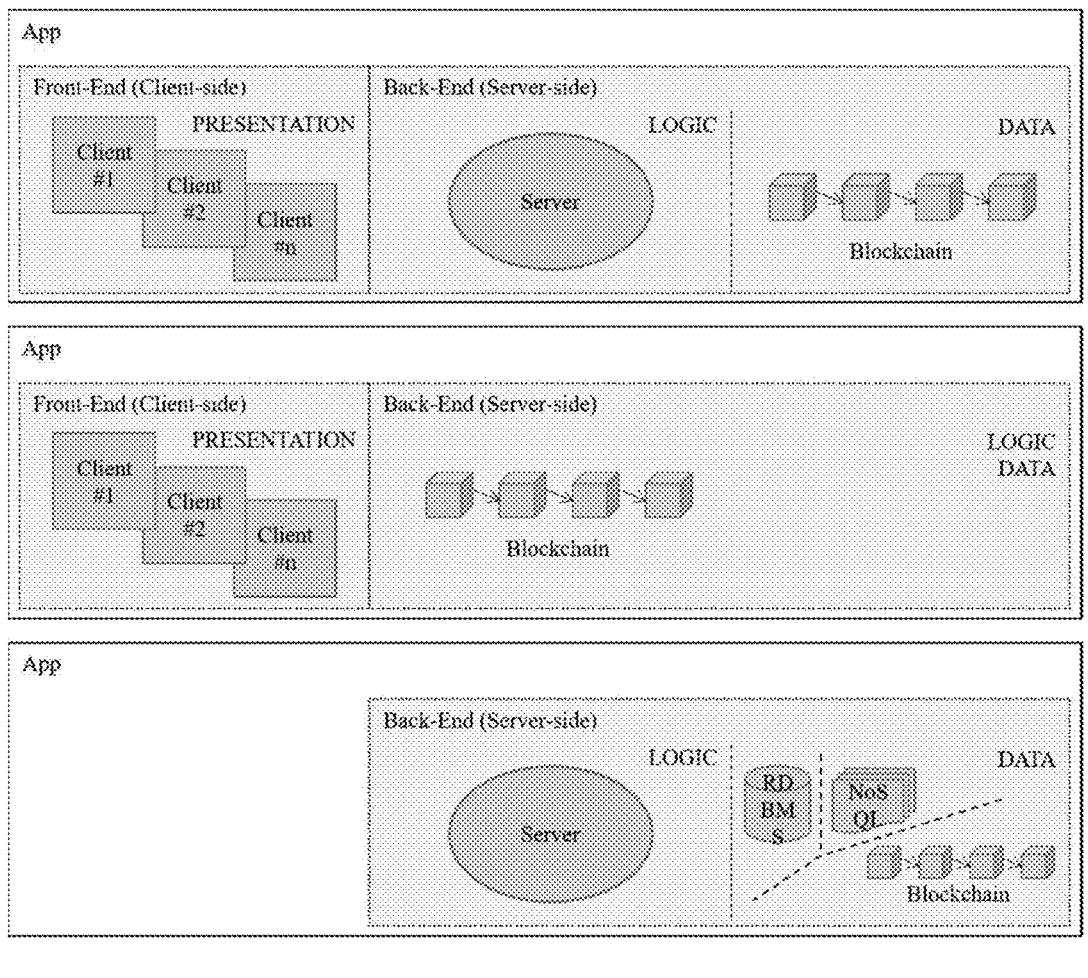

FIGS. 9A-9C exemplarily illustrate schematic diagrams showing applications and topologies of different types that can be realized using the tri-affinity model driven method as disclosed in the detailed description of FIGS. 1A-1B and FIG. 8.

Figure 10:
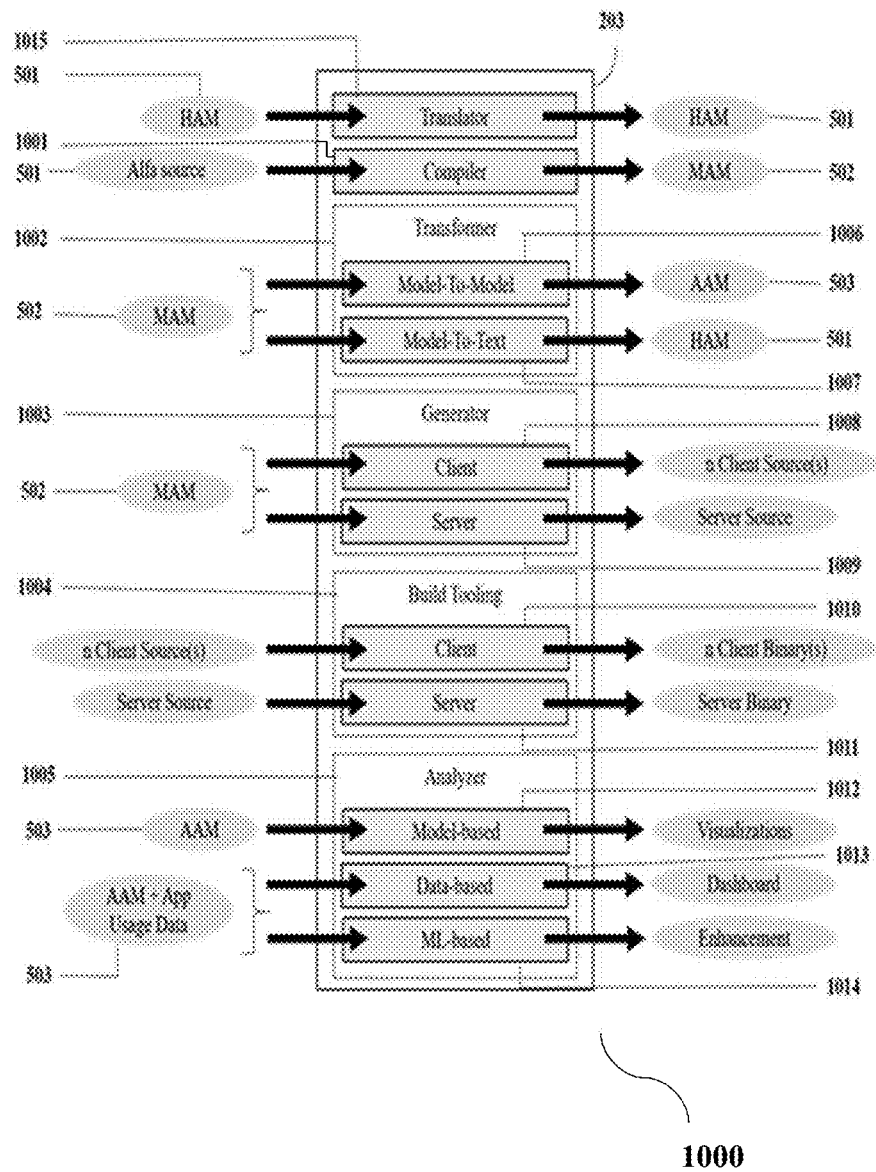
FIG. 10 exemplarily illustrates a schematic diagram of the tri-affinity model driven platform development subsystem of the tri-affinity model driven platform.

FIG. 10 exemplarily illustrates a schematic diagram of the tri-affinity model driven platform (TAMDP) development subsystem 203 of the TAMDP 202 exemplarily illustrated in FIG. 2. The TAMDP development subsystem 203 compiles the human affinity model 501 into the machine affinity model 502 using the compiler 1001, or in an embodiment, directly generates the machine affinity model 502 of the application on receiving inputs of values, for example, via chat bots, a what-you-see-is-what-you-get (WYSIWYG) editor, etc. The result of authoring an application is a human affinity model 501. An embodiment of a human affinity model 501 is a source program written using a domain specific language, such as Alfa. A human affinity model of an application specifies an application comprehensively covering, for example, namespace, application, process, user interface, data, configuration, and locale aspects. The compiler 1001 compiles an Alfa program source into the corresponding model instances for each of these aspects. The translator 1015 provides an optional translation service to translate a human affinity model 501 of an application to another human affinity model 501 of the same application. In an embodiment, a human affinity model of an application 501 authored in a vernacular dialect, such as English, is translated using the translator 1015 into another human affinity model 501 of the same application, in another vernacular dialect, such as Hindi.

The transformers 1002 of the tri-affinity model driven platform (TAMDP) development subsystem 203 comprise the model-to-model transformer 1006 and the model-to-text transformer 1007. The model-to-model transformer 1006 transforms the machine affinity model 502 to the analysis affinity model 503. The model-to-text transformer 1007 transforms the machine affinity model 502 to the human affinity model 501. The machine affinity model 502 supports transformations, for example, model-to-model transformation, model-to-text transformation, any-to-model transformation, etc. The machine affinity model transformations are achieved by software methods implemented using model driven engineering concepts. The model-to-source code generator 1003 in the TAMDP development subsystem 203 transforms the machine affinity model 502 to generate a platform specific source code for client side 1008 and server side 1009 renditions of different types. Using the build tooling 1004 of the target platforms of client side 1010 and server side 1011 renditions, the TAMDP 202 generates platform specific binaries for the target client only rendition, the target client and the TAMDP server rendition, N target clients and the TAMDP server rendition, the target client and a third party server rendition, and the N target clients and the third party server rendition. The development time analyzer and visualizer 1005 comprises a model based analyzer 1012, a data based analyser 1013, and a machine learning based analyzer 1014 for performing various analyses based on model, data, and machine learning respectively, to provide insight into usage of the application and enhance the application models based on the application usage data.

Figure 11:
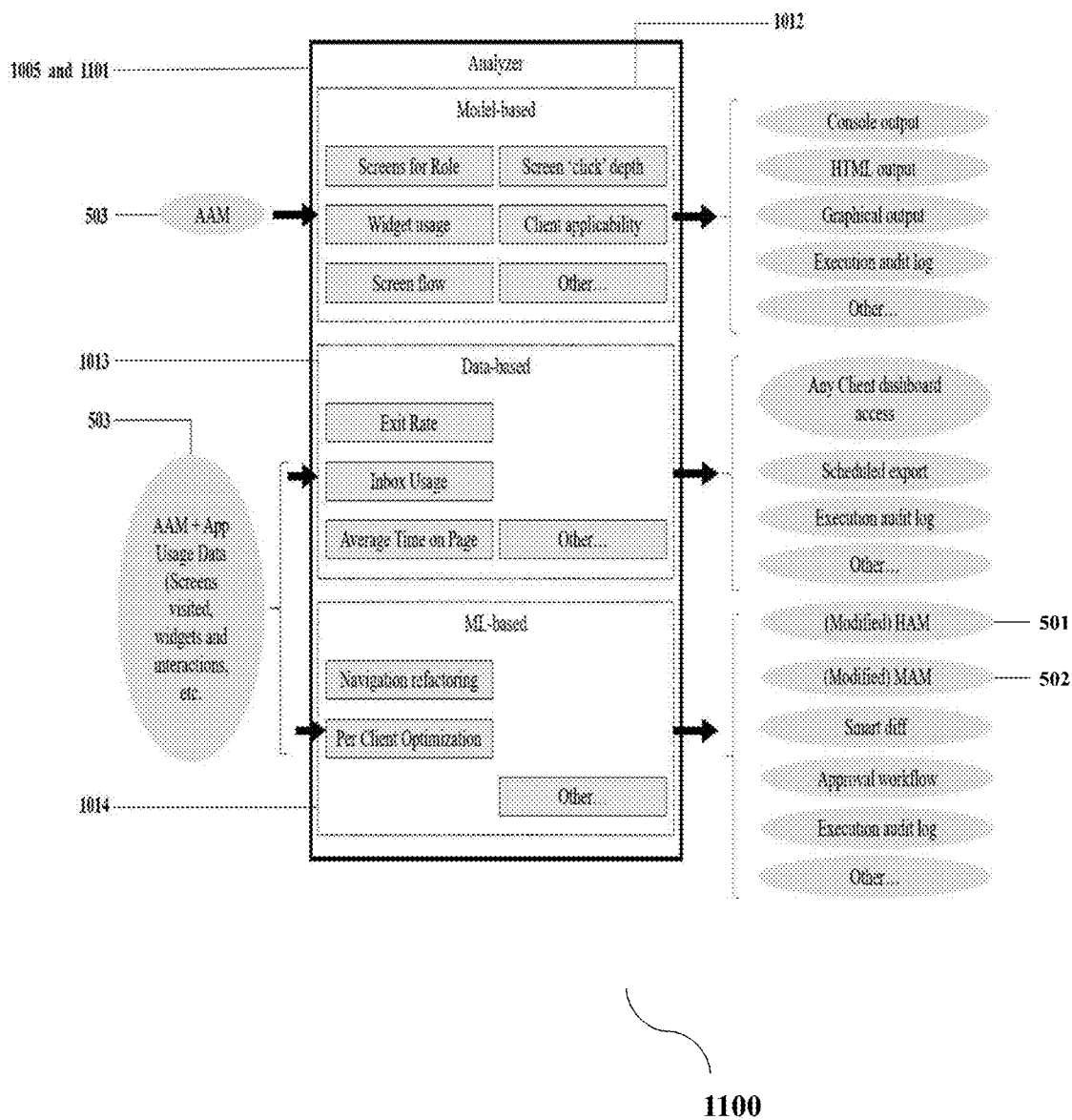
FIG. 11 exemplarily illustrates a schematic diagram of a development time analyzer and visualizer and the runtime analyzer and visualizer in the tri-affinity model driven platform for performing analyses of different types on the realized application during development time and runtime respectively.

FIG. 11 exemplarily illustrates a schematic diagram of the development time analyzer and visualizer 1005 and the runtime analyzer and visualizer 1101 in the tri-affinity model driven platform (TAMDP) 202 exemplarily illustrated in FIG. 2, for performing analyses of different types on the realized application during development time and runtime respectively. During development time, the model based analyzer 1012 uses the analysis affinity model 503 to analyze, for example, screen flows, the number of steps to reach a screen, different screen elements presented for an end user role, etc., in the application, and provides the analyses as a console output, hypertext markup language (HTML) pages, records in an audit log, etc. During runtime, the data based analyzer 1013 uses the application usage data and the analysis affinity model 503 to analyze, for example, exit times on pages, inbox usage, etc., in the application, and provides the analyses, for example, as a client based dashboard, records in an audit log, etc. During runtime, the machine learning based analyzer 1014 uses the application usage data and the analysis affinity model 503 to analyze, for example, frequent navigation performed, types of optimizations for devices, etc., in the application, and provides the analyses, for example, as recommended modifications on the human affinity model 501 and the machine affinity model 502, suggested different navigation paths, etc.

Figure 12:
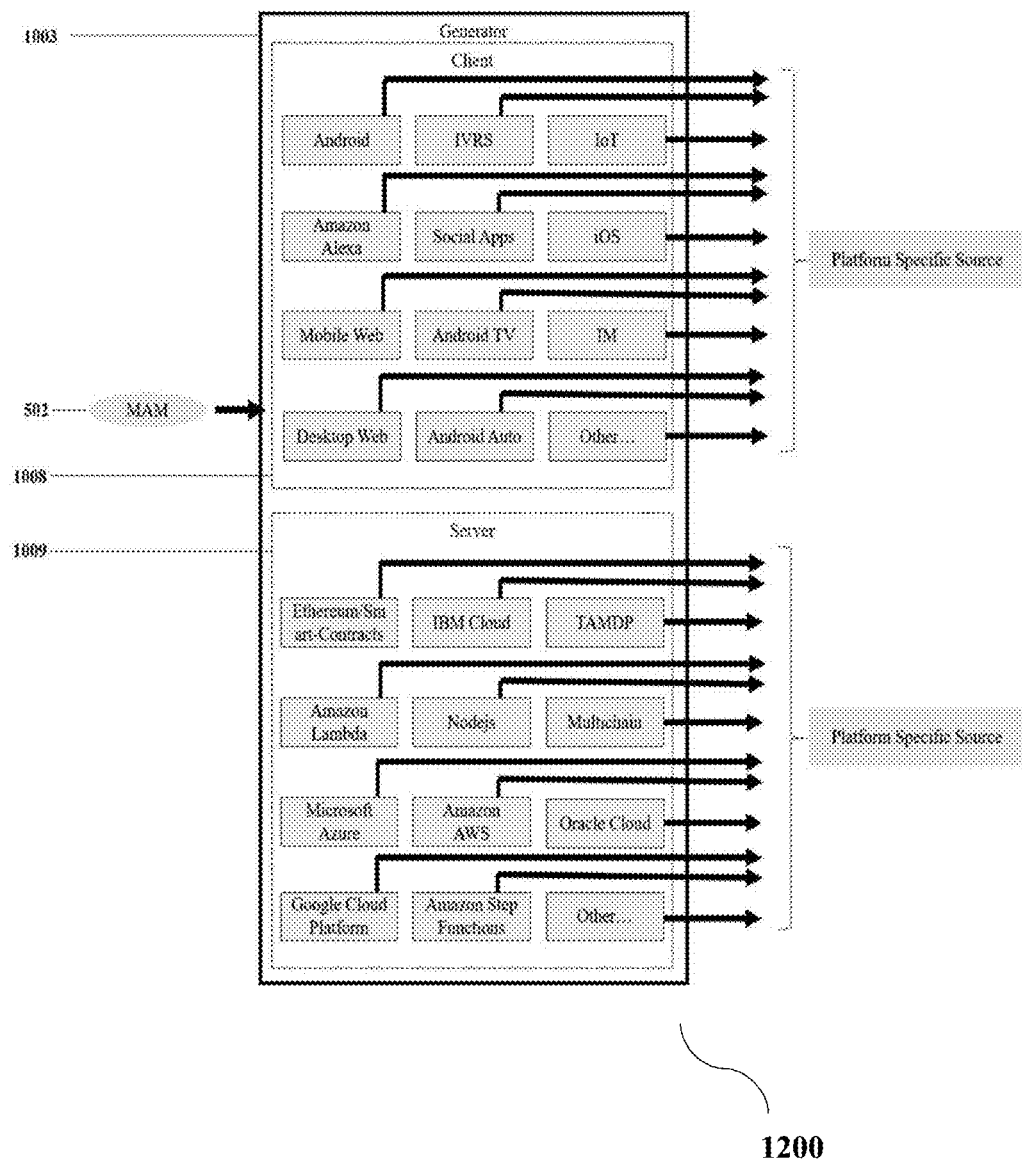
FIG. 12 exemplarily illustrates a schematic diagram of a model-to-source code generator in the tri-affinity model driven platform development subsystem for generating a source code for an application of different rendering types on supported client and server platforms.

FIG. 12 exemplarily illustrates a schematic diagram of the model-to-source code generator 1003 in the tri-affinity model driven platform (TAMDP) development subsystem 203 exemplarily illustrated in FIG. 2, for generating a source code for an application of different rendering types on supported client and server platforms by performing model-to-text transformations. The model-to-source code generator 1003 performs model-to-text transformations with the machine affinity model 502 as input to generate a source code for a target client only rendition, a target client and the TAMDP server rendition, N target clients and the TAMDP server rendition, a target client and a third party server rendition, and N target clients and a third party server rendition.

Figure 13:
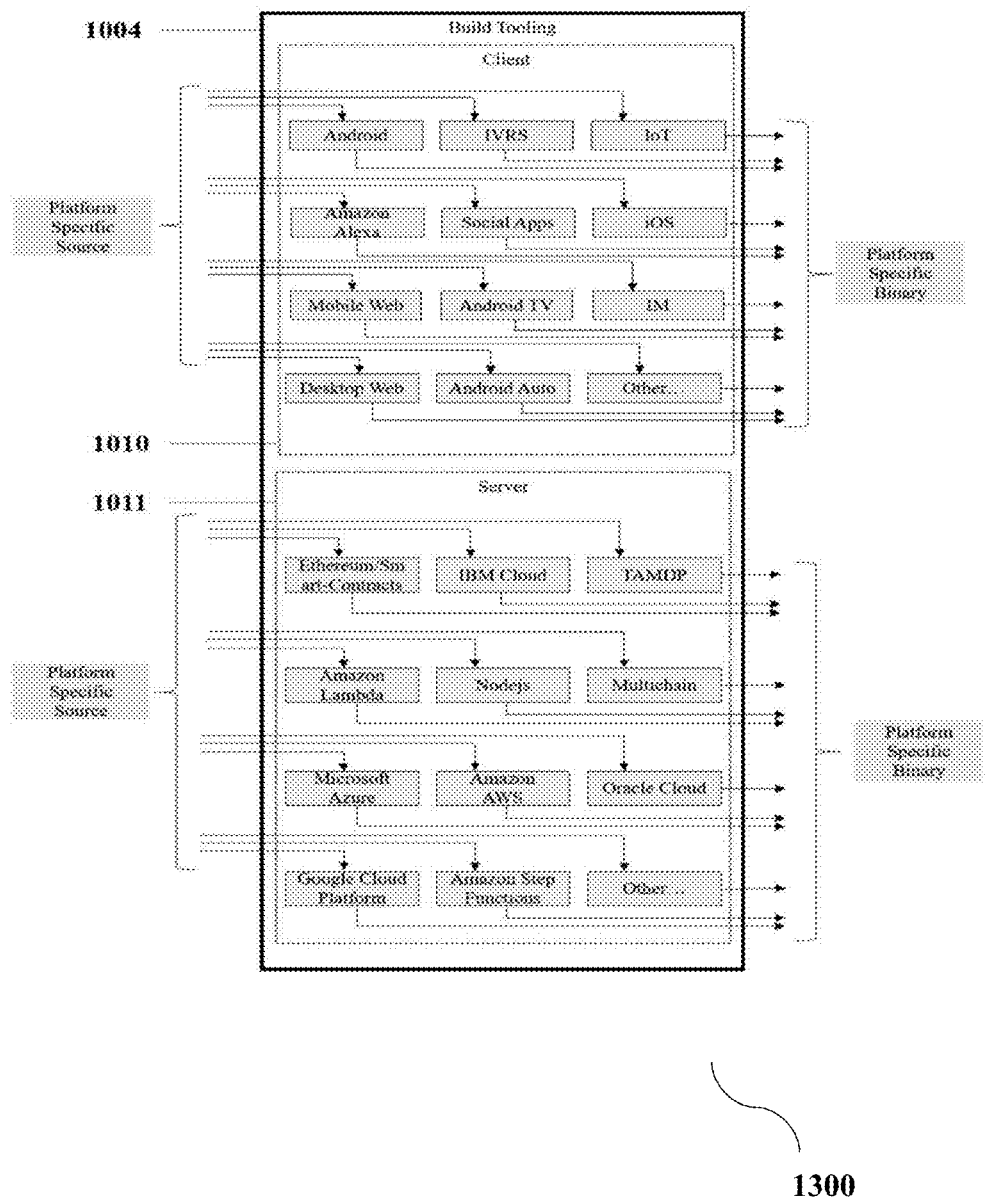
FIG. 13 exemplarily illustrates a schematic diagram of build tooling in the tri-affinity model driven platform development subsystem for generating an executable binary for an application of different rendering types on supported client and server platforms.

FIG. 13 exemplarily illustrates a schematic diagram of the build tooling 1004 in the tri-affinity based model development platform (TAMDP) development subsystem 203 exemplarily illustrated in FIG. 2, for generating an executable binary for an application of different rendering types on supported client and server platforms. The TAMDP development subsystem 203 uses the build tooling 1004 for transforming the machine affinity model 502 exemplarily illustrated in FIG. 5, to a target client binary and a target server binary for different rendering types, for example, the target client and the TAMDP server rendition, N target clients and the TAMDP server rendition, and only the TAMDP server rendition.

Figure 14:
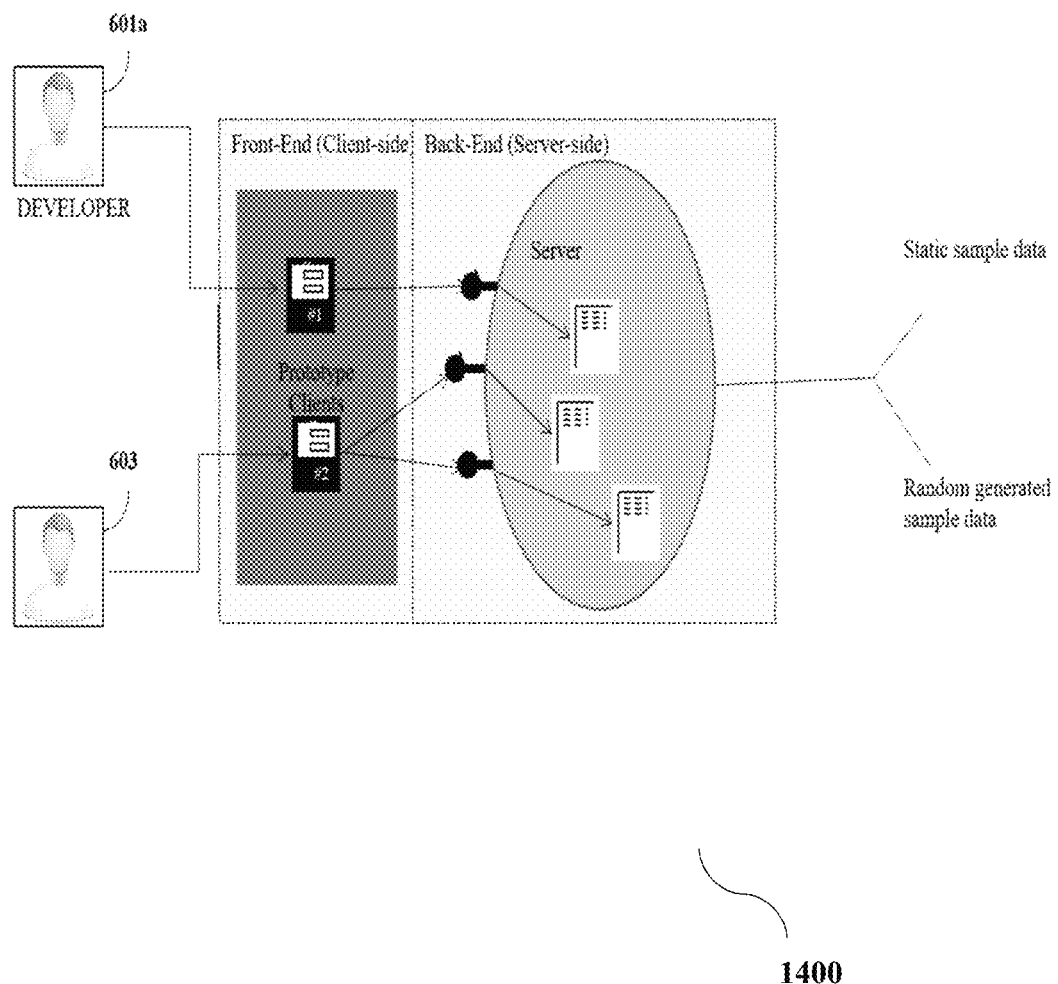
FIG. 14 exemplarily illustrates a schematic diagram showing steps performed by the tri-affinity model driven platform development subsystem for prototyping an application during development time.

FIG. 14 exemplarily illustrates a schematic diagram showing steps performed by the tri-affinity model driven platform (TAMDP) development subsystem 203 exemplarily illustrated in FIG. 2, for prototyping an application during development time. A developer 601a uses the generated application as a prototype with sample data, either as a set of static values or as a set of randomly generated values. The developer 601a shares the application with the intended user audience or end users 603 to obtain validation and feedback before deploying the application into production. After receiving satisfactory acceptance, the developer 601a makes the application available for use on the TAMDP application store.

Figure 15:
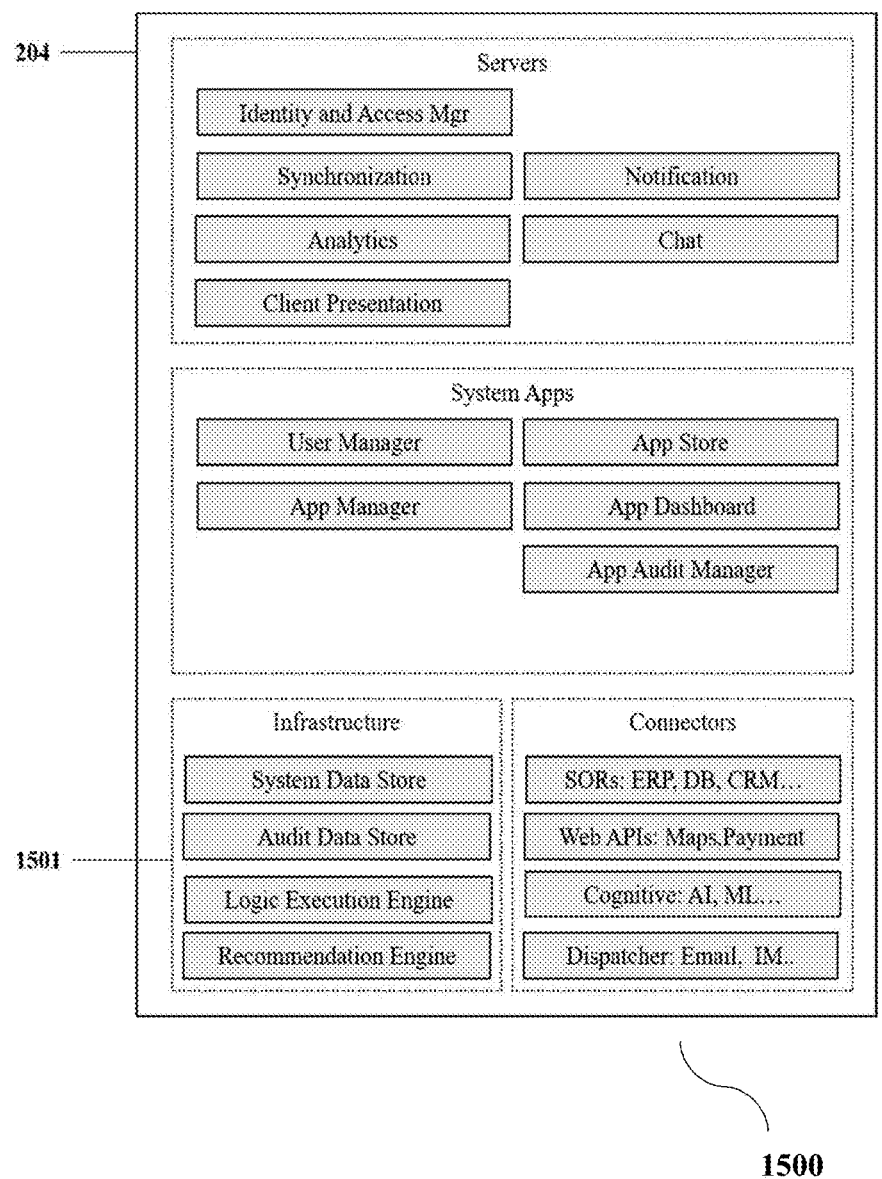
FIG. 15 exemplarily illustrates a schematic diagram of the tri-affinity model driven platform runtime subsystem of the tri-affinity model driven platform.

FIG. 15 exemplarily illustrates a schematic diagram of the tri-affinity model driven platform (TAMDP) runtime subsystem 204 of the TAMDP 202 exemplarily illustrated in FIG. 2. The TAMDP runtime subsystem 204 comprises the runtime analyzer and visualizer 1101 exemplarily illustrated in FIG. 11, the runtime logger, and runtime infrastructure for deploying and running the application. The runtime infrastructure comprises the server runtime, the runtime notification server, the runtime synchronization server, the runtime identity and authorization server, and the runtime analytics server. The TAMDP runtime subsystem 204 also provides different connectors 1501 to connect the generated application to multiple data sources. The multiple data sources comprise, for example, enterprise applications, web applications, enterprise databases, Microsoft Excel® of Microsoft Corporation, comma-separated values (csv) files, web services, application programming interfaces (APIs), etc. The TAMDP runtime subsystem 204 further comprises an application manager, an application publishing store, and an application configurator. The TAMDP runtime subsystem 204 hosts the generated server-side application binary to interact with client devices with, for example, user interfaces, an interactive voice response system (IVRS), internet of things (IoT) platforms, application programming interfaces (APIs), or representational state transfer (REST)/simple object access protocol (SOAP) systems.

Figure 16:
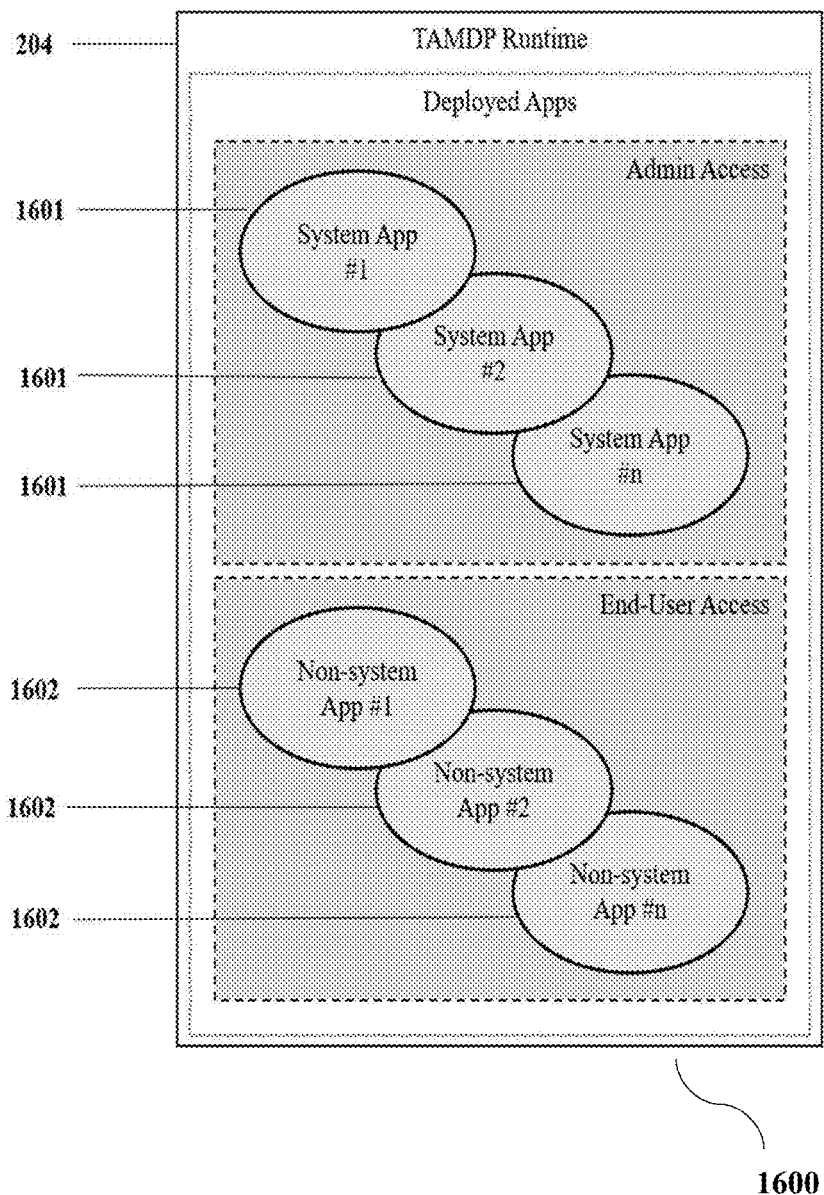
FIG. 16 exemplarily illustrates a schematic diagram showing system applications and non-system applications deployed on an instance of the tri-affinity model driven platform runtime subsystem of the tri-affinity model driven platform.

FIG. 16 exemplarily illustrates a schematic diagram showing system applications 1601 and non-system applications 1602 deployed on an instance of the tri-affinity model driven platform (TAMDP) runtime subsystem 204 of the TAMDP 202 exemplarily illustrated in FIG. 2, for execution in the TAMDP client or other server environment. The TAMDP runtime subsystem 204 comprises one or more non-system applications 1602, and one or more system applications 1601 for use by the non-system applications 1602. The application manager or the end user 603 exemplarily illustrated in FIG. 6, uses the system applications 1601 to manage and run the non-system applications 1602. The end users 603 also use the non-system applications 1602.

Figure 17:
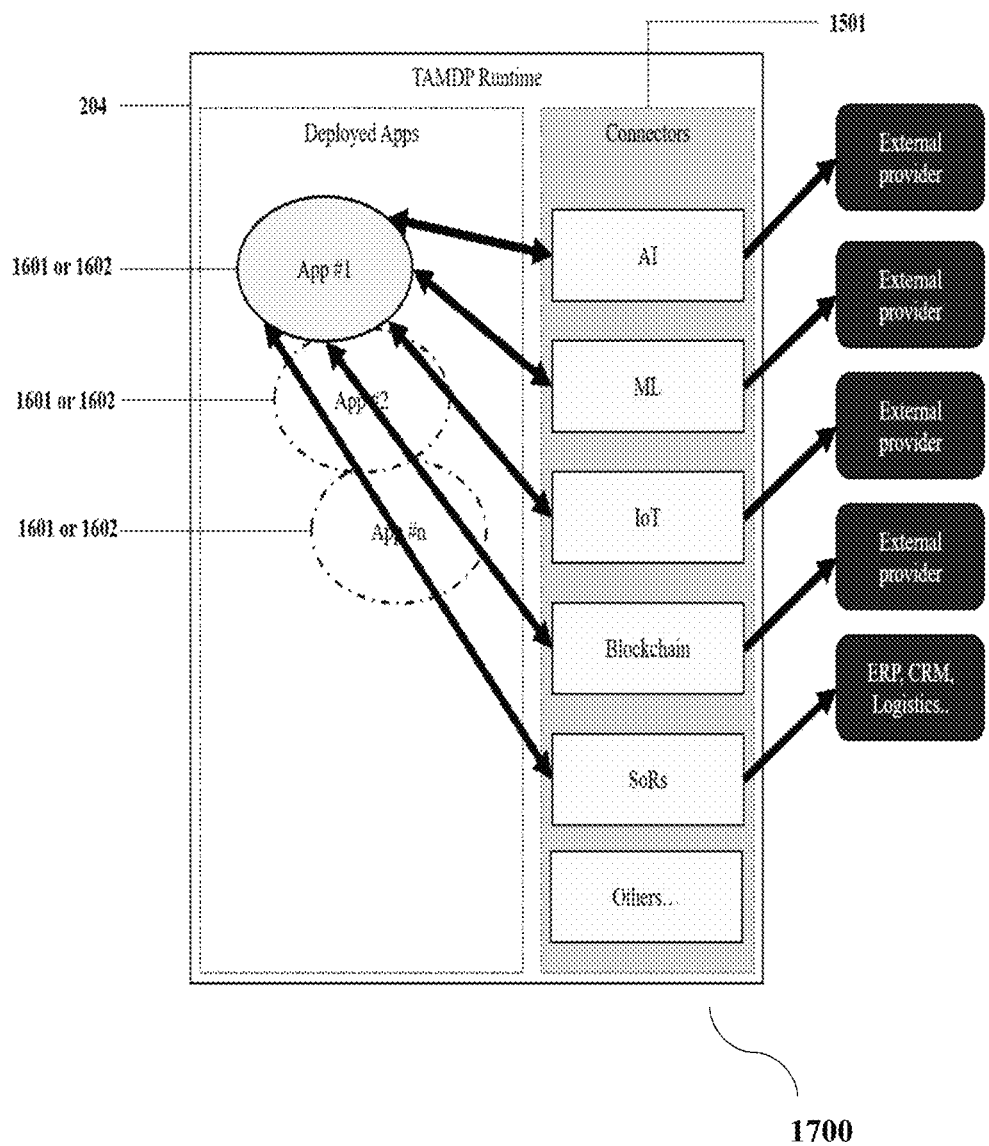
FIG. 17 exemplarily illustrates a schematic diagram showing data stores and services of different types to which an application built using the tri-affinity model driven platform connects.

FIG. 17 exemplarily illustrates a schematic diagram showing data stores and services of different types to which an application built using the tri-affinity model driven platform (TAMDP) 202 exemplarily illustrated in FIG. 2, connects. One or more system application 1601 or non-system applications 1602 connect to one or more external entities, for example, data stores, web services, system-of-records (SoRs), etc., using the connectors 1501.

Figure 18:
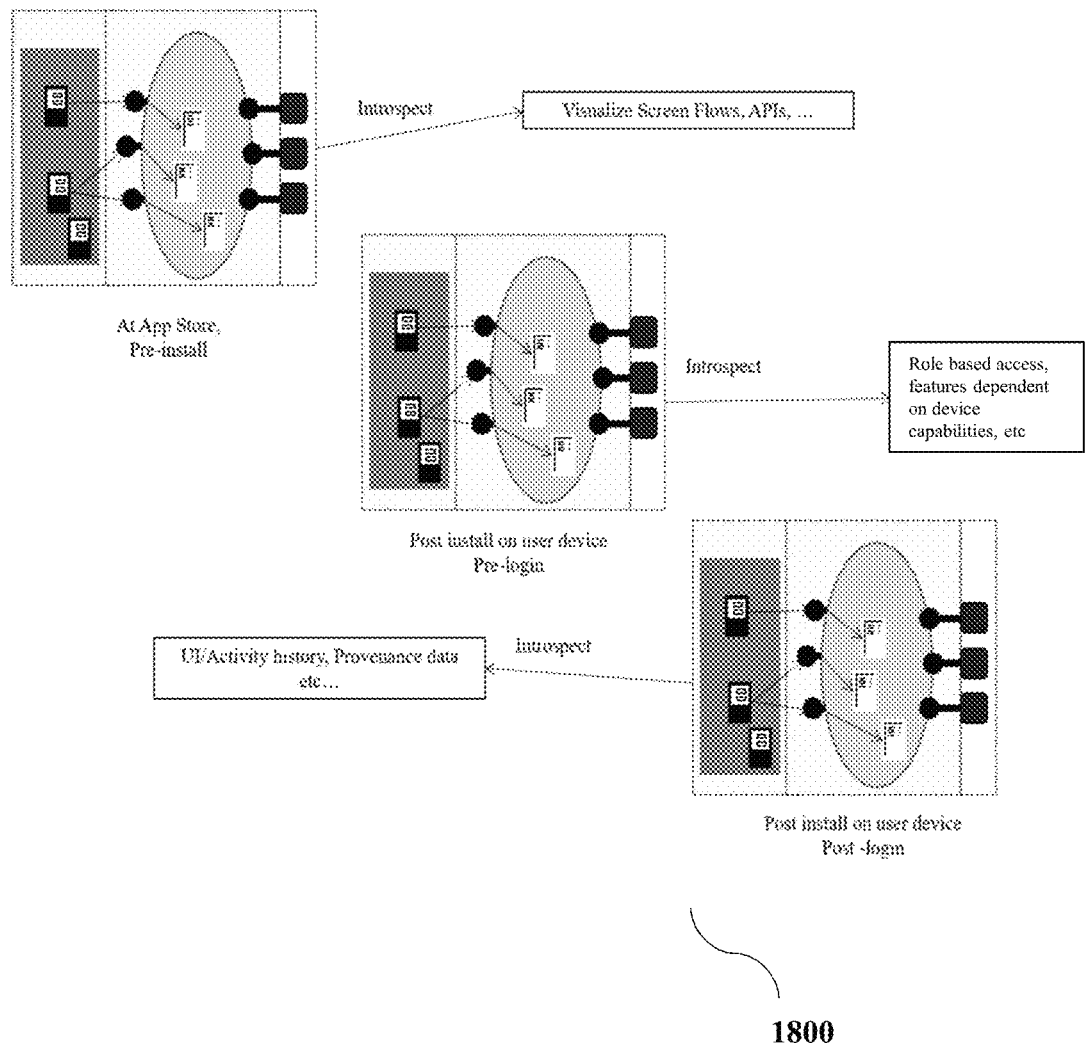
FIG. 18 exemplarily illustrates a schematic diagram showing steps of introspection performed at various stages of usage of an application when the application is executed and run in the tri-affinity model driven platform.

FIG. 18 exemplarily illustrates a schematic diagram showing steps of introspection performed at various stages of usage of an application when the application is executed and run in the tri-affinity model driven platform (TAMDP) 202 exemplarily illustrated in FIG. 2. The introspection is performed using the analysis affinity model 503 exemplarily illustrated in FIG. 5, to provide answer to questions asked by an end user 603 exemplarily illustrated in FIG. 6, at a preinstall stage. An introspection chat bot uses the analysis affinity model 503 and the device data to provide answers to the questions asked by the end user 603 at the post-install stage and the pre-login stage. The introspection chat hot uses the analysis affinity model 503 and the data stores to provide answers to questions asked by the end user 603 at the post-install stage and the post-login stage.

Figure 19:
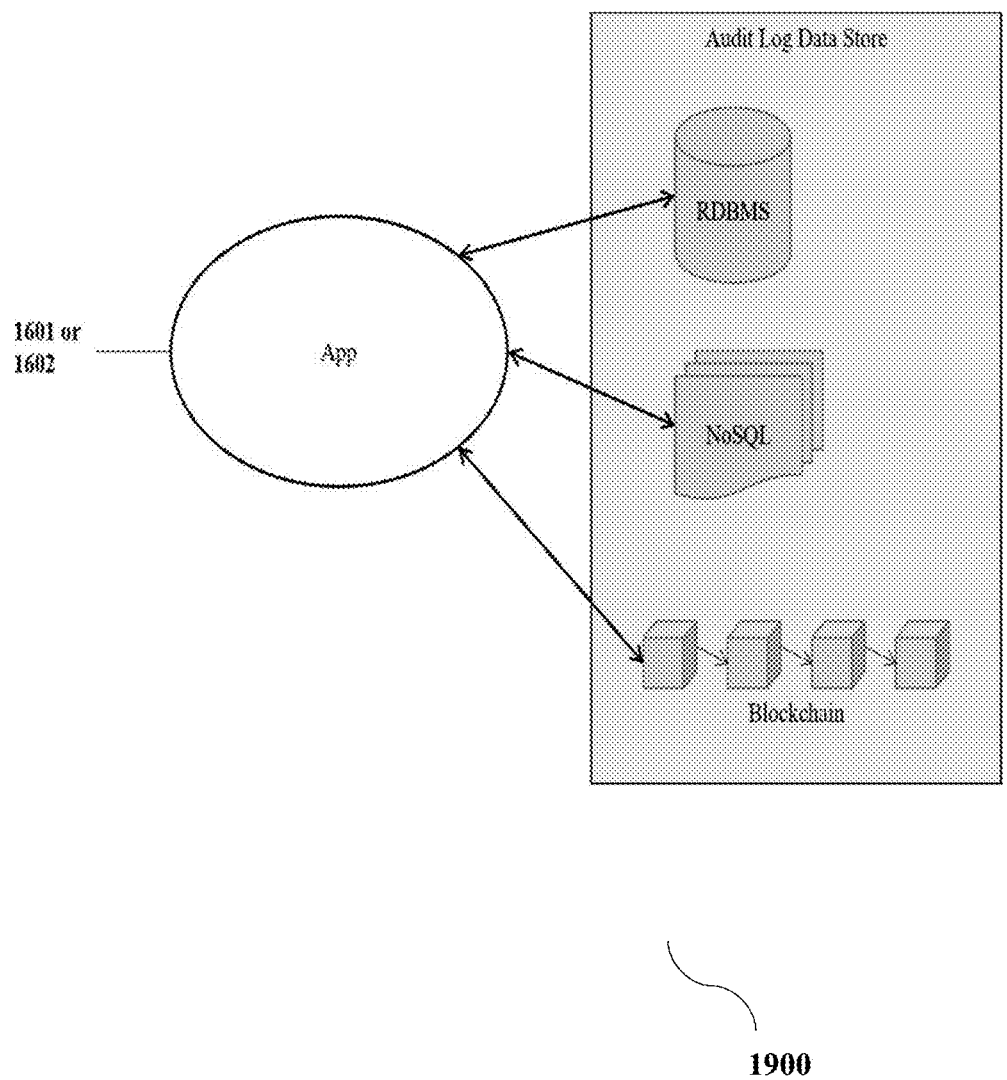
FIG. 19 exemplarily illustrates a schematic diagram showing persistent stores of different types supported by a runtime logger of the tri-affinity model driven platform runtime subsystem for managing an application.

FIG. 19 exemplarily illustrates a schematic diagram showing persistent stores of different types supported by the runtime logger of the tri-affinity model driven platform (TAMDP) runtime subsystem 204 exemplarily illustrated in FIG. 2, for managing an application. The TAMDP runtime subsystem 204 records and collects usage data of selected business activities and selected administration activities based on the analysis affinity model 503 exemplarily illustrated in FIG. 5, created upon the usage of a system application 1601 or a non-system application 1602 by the end users 603 and administrators 602 exemplarily illustrated in FIG. 6. The TAMDP runtime subsystem 204 stores the collected usage data, for example, in a relational database management system (RDBMS), a NoSQL data store, or a blockchain based data store to provide differing qualities of service.

Figure 20:
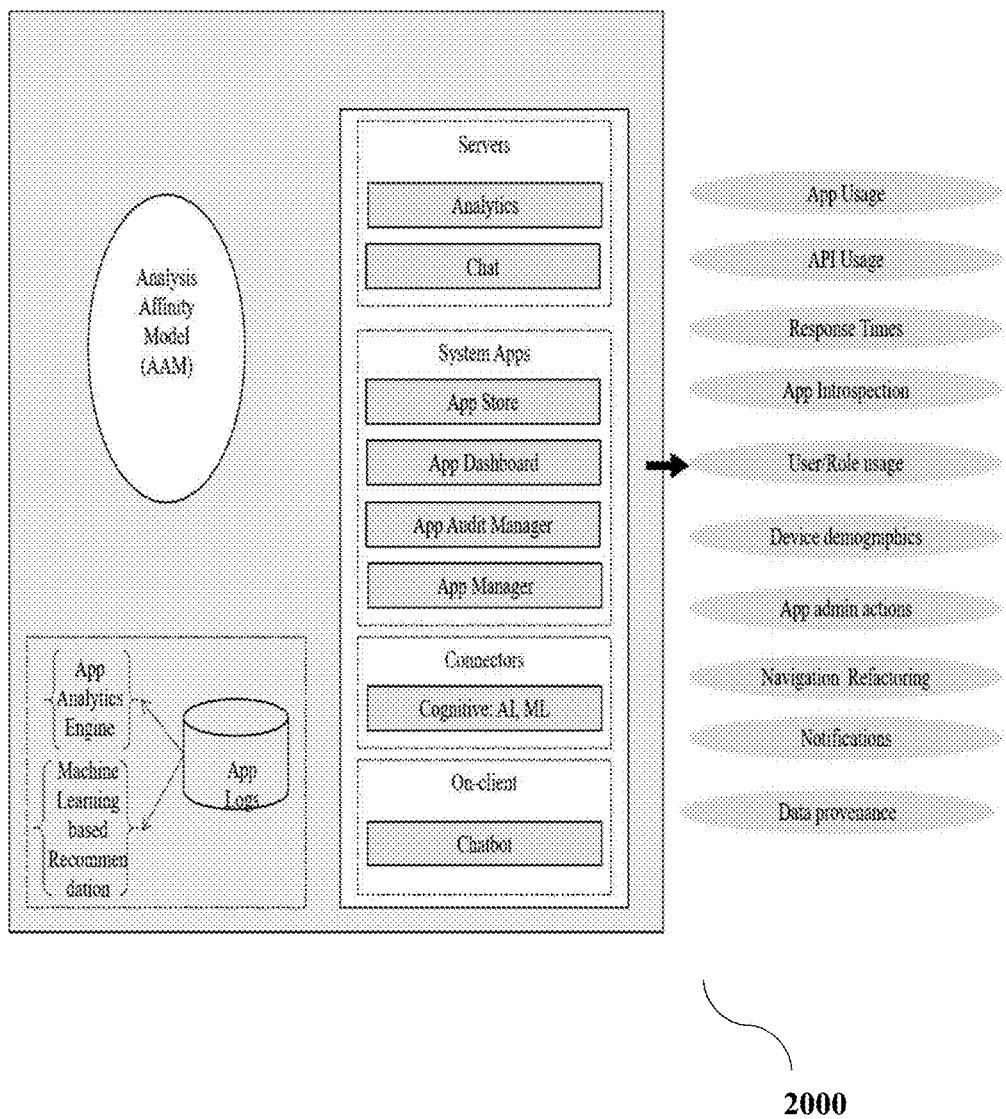
FIG. 20 exemplarily illustrates a schematic diagram showing analyses of different types performed by a runtime analyzer and visualizer of the tri-affinity model driven platform runtime subsystem.

FIG. 20 exemplarily illustrates a schematic diagram showing analyses of different types performed by the runtime analyzer and visualizer 1101 of the tri-affinity model driven platform (TAMDP) runtime subsystem 204 exemplarily illustrated in FIG. 2 and FIG. 11. The runtime analyzer and visualizer 1101 acts on the collected usage data and provides various types of analyses. A recommendation engine of the TAMDP 202 exemplarily illustrated in FIG. 2, acts on the collected usage data and suggests enhancements on the application using a machine learning algorithm. The enhancements are carried out on either the human affinity model 501 or the machine affinity model 502 exemplarily illustrated in FIG. 5 and follow the tri-affinity model driven method of application generation.

The foregoing examples have been provided merely for explanation and are in no way to be construed as limiting of the method and the tri-affinity based model development platform (TAMDP) 202 disclosed herein. While the method and the TAMDP 202 have been described with reference to various embodiments, it is understood that the words, which have been used herein, are words of description and illustration, rather than words of limitation. Furthermore, although the method and the TAMDP 202 have been described herein with reference to particular means, materials, and embodiments, the method and the TAMDP 202 are not intended to be limited to the particulars disclosed herein; rather, the method and the TAMDP 202 extend to all functionally equivalent structures, methods and uses, such as are within the scope of the appended claims. While multiple embodiments are disclosed, it will be understood by those skilled in the art, having the benefit of the teachings of this specification, that the method and the TAMDP 202 disclosed herein are capable of modifications and other embodiments may be effected and changes may be made thereto, without departing from the scope and spirit of the method and the TAMDP 202 disclosed herein.

We claim:

1. A tri-affinity model driven method implemented on a tri-affinity model driven platform comprising:

providing one or more processors, wherein executing three types of affinity models by said one or more processors causes said three types of affinity models to author, realize, and analyse a cross-platform application using one or more human languages for authoring;

authoring of an application or parts of the application, in one or more representations of a user interface comprising a textual representation, a voice representation, and a visual representation;

providing predefined canonical meta-models with descriptive attributes for comprehensive description of the application;

deriving one or more non-canonical meta-models for human affinity from the predefined canonical meta-models;

deriving the one or more non-canonical meta-models for analysis affinity from the predefined canonical meta-models;

creating an instance of an application model for a specific application by setting values of descriptive attributes of the predefined canonical meta-models;

one of compiling and transforming the created instance of the application model to achieve the three types of affinity models;

authoring one or more human affinity models using one or more domain specific languages and translating between a plurality of the human affinity models;

analysing and visualizing one of the compiled or the transformed created instance of the application model under development using one or more analysis affinity models; and testing the analysed and the visualised compiled or transformed created instance of the application model in a prototype mode with statically provided sample data or randomly generated sample data.

2. The method of claim 1, further comprising:

deriving the one or more human affinity models, one or more machine affinity models, and the one or more analysis affinity models from the visual representation of the user interface;

analysing operation of the application using the one or more analysis affinity models including provenance querying using an application chat bot;

enhancing the analysed operation of the application using the one or more analysis affinity models and a machine learning based recommendation engine by regenerating the application model, effecting changes that rearrange user interfaces and navigation between the user interfaces; and mutating the application using its conditional code to regenerate user interface properties comprising one or more of height, visibility and width, based on environmental factors comprising one or more of screen size, device form factor, time, date, and geo-position.

3. The method of claim 1, wherein the comprehensive description of the application comprises describing all aspects, all rendering types, all platforms, and all features of the application.

4. The method of claim 1, wherein the three types of affinity models comprise the one or more human affinity models, one or more machine affinity models, and the one or more analysis affinity models.

5. The method of claim 1, wherein a deployed application is introspected using an introspection bot from a user interface of a tri-affinity model driven platform application store in a tri-affinity model driven platform server type of rendition.

6. A tri-affinity system deployed on a tri-affinity model driven platform comprising one or more processors, wherein execution of three types of affinity models by said one or more processors causes said three types of affinity models to author, realize, and analyse a cross-platform application using one or more human languages for authoring, said tri-affinity system comprising:

a tri-affinity model driven platform configured to:

provide predefined canonical meta-models with descriptive attributes for comprehensively describing the application;

derive one or more non-canonical meta-models for human affinity from the predefined canonical meta-models;

derive one or more non-canonical meta-models for analysis affinity from the predefined canonical meta-models;

creating an instance of an application model for a specific application by setting values of descriptive attributes of the predefined canonical meta-models;

one of compile and transform the created instance of the application model to achieve the three affinity models;

author one or more human affinity models using one or more domain specific languages and translate between a plurality of the human affinity models;

analyse and visualize one of the compiled or the transformed created instance of the application model under development using one or more analysis affinity models; and test the analysed and visualized compiled or transformed created instance of the application model in a prototype mode with one or more of statically provided sample data and randomly generated sample data.

7. The system of claim 6, wherein the three types of affinity models comprise the one or more human affinity models, one or more machine affinity models, and the one or more analysis affinity models.

8. The system of claim 6, wherein a deployed application is introspected using an introspection bot from a user interface of a tri-affinity model driven platform application store in a tri-affinity model driven platform server type of rendition.

9. The system of claim 6, further configured to:

derive the one or more human affinity models, one or more machine affinity models, and the one or more analysis affinity models from the visual representation of the user interface;

analyse operation of the application using the one or more analysis affinity models including provenance querying using an application chat bot;

enhance the analysed operation of the application using the one or more analysis affinity models and a machine learning based recommendation engine by regenerating the application model, effecting changes that rearrange user interfaces and navigation between the user interfaces; and mutate the application using its conditional code to regenerate user interface properties comprising one or more of height, visibility and width, based on environmental factors comprising one or more of screen size, device form factor, time, date, and geo-position.

10. The system of claim 6, wherein the comprehensive description of the application comprises describing all aspects, all rendering types, all platforms, and all features of the application.

* * * * *